(12) United States Patent
Hognaland et al.

(10) Patent No.: US 11,772,892 B2
(45) Date of Patent: Oct. 3, 2023

(54) REMOTELY OPERATED VEHICLE FOR A STORAGE SYSTEM

(71) Applicant: Autostore Technology AS, Nedre Vats (NO)

(72) Inventors: Ingvar Hognaland, Nedre Vats (NO); Ivar Fjeldheim, Haugesund (NO); Trond Austrheim, Etne (NO); Borge Bekken, Haugesund (NO)

(73) Assignee: Autostore Technology AS, Nedre Vats (NO)

( * ) Notice: Subject to any disclaimer, the term of this patent is extended or adjusted under 35 U.S.C. 154(b) by 0 days.

(21) Appl. No.: 17/106,209

(22) Filed: Nov. 30, 2020

(65) Prior Publication Data
US 2021/0078802 A1 Mar. 18, 2021

Related U.S. Application Data

(63) Continuation of application No. 15/978,219, filed on May 14, 2018, now Pat. No. 10,882,694, which is a
(Continued)

(30) Foreign Application Priority Data

Jun. 19, 2014 (NO) .................................... 20140773

(51) Int. Cl.
*B65G 1/04* (2006.01)
(52) U.S. Cl.
CPC ......... *B65G 1/0464* (2013.01); *B65G 1/0478* (2013.01)
(58) Field of Classification Search
CPC .............................. B65G 1/0464; B65G 1/0478
See application file for complete search history.

(56) References Cited

U.S. PATENT DOCUMENTS 3,779,403 A 12/1973 Young
3,800,963 A 4/1974 Holland
(Continued)

FOREIGN PATENT DOCUMENTS

CA 2920669 A1 2/2015
CH 640797 A5 1/1984
(Continued)

OTHER PUBLICATIONS

Office Action in counterpart Japanese Patent Application No. 2020-190730 dated Jul. 9, 2021 (25 pages).
(Continued)

*Primary Examiner* — James Keenan
(74) *Attorney, Agent, or Firm* — Osha Bergman Watanabe & Burton LLP

(57) ABSTRACT

A remotely-operated vehicle assembly for picking up storage bins from a storage system and a method for changing vehicle direction includes a body displaying a cavity, a lifting device connected to the body for lifting the bin into the cavity, a displacement arrangement including a displacement motor which provides power to displace one or both of first and second sets of vehicle wheels between a displaced state where the relevant vehicle wheels are displaced away from the underlying system during use, and a non-displaced state where the relevant vehicle wheels are in contact with the underlying system during use, and driving wheels coupled to the displacement arrangement. The driving wheels further includes first and second sets of vehicle wheels connected to the body allowing movement of the vehicle along first and second directions, respectively, within the system. The first and second directions are perpendicular.

10 Claims, 16 Drawing Sheets

Related U.S. Application Data continuation of application No. 15/319,103, filed as application No. PCT/EP2015/063415 on Jun. 16, 2015, now Pat. No. 10,294,025.

(56) References Cited

U.S. PATENT DOCUMENTS

| | | |
|---|---|---|
| 4,088,232 A | 5/1978 | Lilly |
| 4,265,582 A | 5/1981 | Theobald |
| 4,470,742 A | 9/1984 | Schindler |
| 4,998,595 A | 3/1991 | Yeh |
| 5,180,334 A | 1/1993 | Nakane et al. |
| 5,190,427 A | 3/1993 | Lai |
| 5,201,819 A | 4/1993 | Shiraishi et al. |
| 6,471,309 B1 | 10/2002 | Turner |
| 6,654,662 B1 | 11/2003 | Hognaland |
| 7,381,022 B1 | 6/2008 | King |
| 7,729,797 B2 | 6/2010 | Akamatsu et al. |
| 8,628,289 B1 | 1/2014 | Benedict et al. |
| 8,651,790 B2 | 2/2014 | Benedict et al. |
| 8,670,861 B2 | 3/2014 | Yoshinaga |
| 8,731,740 B2 | 5/2014 | Ogawa |
| 8,734,079 B1 | 5/2014 | Razumov |
| 9,004,840 B2 | 4/2015 | Kinugawa et al. |
| 9,020,636 B2 | 4/2015 | Tadayon |
| 9,168,930 B2 | 10/2015 | Wada |
| 9,422,108 B2 | 8/2016 | Hognaland |
| 9,656,802 B2 | 5/2017 | Hognaland |
| 9,682,822 B2 | 6/2017 | Lindbo et al. |
| 9,856,082 B2 | 1/2018 | Hognaland |
| 9,862,579 B2 | 1/2018 | Hognaland |
| 10,000,337 B2 | 6/2018 | Lindbo et al. |
| 10,577,178 B2 | 3/2020 | Lindbo et al. |
| 2003/0229416 A1 | 12/2003 | Tai et al. |
| 2004/0165974 A1 | 8/2004 | Gironi et al. |
| 2004/0211606 A1 | 10/2004 | Prucher |
| 2005/0191160 A1 | 9/2005 | Melin et al. |
| 2005/0225275 A1 | 10/2005 | Eskritt et al. |
| 2006/0182552 A1 | 8/2006 | Jiang et al. |
| 2007/0059132 A1 | 3/2007 | Akamatsu et al. |
| 2007/0125727 A1 | 6/2007 | Winkler |
| 2008/0075568 A1 | 3/2008 | Benedict et al. |
| 2008/0075569 A1 | 3/2008 | Benedict et al. |
| 2008/0226437 A1 | 9/2008 | de Milly |
| 2008/0289309 A1 | 11/2008 | Gust et al. |
| 2009/0074545 A1 | 3/2009 | Lert, Jr. et al. |
| 2009/0136331 A1 | 5/2009 | Muser |
| 2010/0301712 A1 | 12/2010 | Amutham |
| 2011/0168465 A1 | 7/2011 | Starr |
| 2011/0259658 A1 | 10/2011 | Huang et al. |
| 2012/0118845 A1 | 5/2012 | Wada |
| 2012/0152877 A1 | 6/2012 | Tadayon |
| 2012/0189411 A1 | 7/2012 | Yoshinaga |
| 2012/0215389 A1 | 8/2012 | Perry et al. |
| 2013/0049549 A1 | 2/2013 | Folmli et al. |
| 2013/0099554 A1 | 4/2013 | Lee |
| 2013/0103248 A1 | 4/2013 | Ogawa |
| 2013/0142597 A1 | 6/2013 | Kinugawa et al. |
| 2013/0307450 A1 | 11/2013 | Fuller et al. |
| 2014/0015382 A1 | 1/2014 | Kim |
| 2014/0035347 A1 | 2/2014 | Zanfei et al. |
| 2014/0086714 A1 | 3/2014 | Malik |
| 2014/0113828 A1 | 4/2014 | Gilbert et al. |
| 2014/0133943 A1 | 5/2014 | Razumov |
| 2014/0148985 A1 | 5/2014 | Sato et al. |
| 2014/0191624 A1 | 7/2014 | Jahshan |
| 2015/0127143 A1 | 5/2015 | Lindbo et al. |
| 2015/0307276 A1 | 10/2015 | Hognaland |
| 2015/0375388 A1 | 12/2015 | Ullrich |
| 2016/0129587 A1 | 5/2016 | Lindbo et al. |
| 2016/0145058 A1 | 5/2016 | Lindbo |
| 2016/0194151 A1 | 7/2016 | Lindbo et al. |
| 2017/0129703 A1 | 5/2017 | Lindbo et al. |
| 2017/0129706 A1 | 5/2017 | Hognaland |
| 2019/0225436 A1 | 7/2019 | Lindbo et al. |
| 2020/0307911 A1 | 10/2020 | Austrheim et al. |

FOREIGN PATENT DOCUMENTS

| | | |
|---|---|---|
| CN | 1248954 A | 3/2000 |
| CN | 1288287 A | 3/2001 |
| CN | 1454179 A | 11/2003 |
| CN | 103612882 | 3/2014 |
| CN | 103612882 A | 3/2014 |
| CN | 103818672 A | 5/2014 |
| CN | 204046343 U | 12/2014 |
| CN | 104837747 A | 8/2015 |
| DE | 1556071 A1 | 9/1969 |
| DE | 19935742 | 2/2001 |
| DE | 19935742 A1 | 2/2001 |
| DE | 102009017241 | 10/2010 |
| DE | 20 2009 014 456 | 4/2011 |
| DE | 102010047872 A1 | 5/2011 |
| DE | 102009017241 B4 | 12/2016 |
| DK | 2562072 T3 | 5/2015 |
| EP | 0034154 | 3/1981 |
| EP | 34154 A1 | 8/1981 |
| EP | 34154 B1 | 5/1984 |
| EP | 1037828 B1 | 9/2003 |
| EP | 2308778 A2 | 4/2011 |
| EP | 2479052 A1 | 7/2012 |
| EP | 2562072 A1 | 2/2013 |
| EP | 2765018 A3 | 7/2015 |
| EP | 3050824 A1 | 8/2016 |
| EP | 3152998 B1 | 4/2017 |
| EP | 2962962 B1 | 4/2018 |
| EP | 3157847 B1 | 4/2018 |
| EP | 3070027 B1 | 11/2018 |
| EP | 2928794 B1 | 3/2019 |
| EP | 3050824 B1 | 10/2019 |
| FR | 2730715 | 8/1996 |
| FR | 2730715 A1 | 8/1996 |
| GB | 1314313.6 | 8/2013 |
| GB | 2514930 | 12/2014 |
| GB | 2514930 A | 12/2014 |
| GB | 1314313.6 | 2/2015 |
| GB | 2520104 | 5/2015 |
| GB | 2520104 A | 5/2015 |
| IM | 317366 B1 | 10/2004 |
| JP | S46-14471 Y1 | 5/1971 |
| JP | S4983778 A | 8/1974 |
| JP | S56011969 A | 2/1981 |
| JP | S56011969 U | 3/1981 |
| JP | S57124503 A | 8/1982 |
| JP | S57124503 U | 8/1982 |
| JP | S57125895 A | 8/1982 |
| JP | H04235822 A | 8/1992 |
| JP | H10203647 A | 8/1998 |
| JP | H10278596 A | 10/1998 |
| JP | 10-299280 | 11/1998 |
| JP | H10299280 A | 11/1998 |
| JP | H11165980 A | 6/1999 |
| JP | 11-278607 | 10/1999 |
| JP | H11278607 A | 10/1999 |
| JP | 2000134185 A | 5/2000 |
| JP | 2001522342 A | 11/2001 |
| JP | 2004014749 A | 1/2004 |
| JP | 2012116651 A | 6/2012 |
| JP | 4983778 B2 | 7/2012 |
| JP | 2016-529181 A | 9/2016 |
| JP | 2016183050 A | 10/2016 |
| KR | 100555037 B1 | 3/2006 |
| NO | 317366 | 1/2001 |
| NO | 20121488 | 6/2014 |
| NO | 20121488 A1 | 6/2014 |
| NO | 20140773 A1 | 12/2015 |
| TW | 575409 B | 2/2004 |
| TW | I233913 B | 6/2005 |
| WO | 98/49075 | 11/1998 |
| WO | 9849075 | 11/1998 |
| WO | 1998049075 A1 | 11/1998 |
| WO | 2005077789 | 8/2005 |
| WO | 2005077789 A1 | 8/2005 |
| WO | 2007007354 A1 | 1/2007 |
| WO | 2007043129 A1 | 4/2007 |
| WO | 2013167907 | 11/2013 |

(56) References Cited

FOREIGN PATENT DOCUMENTS

| WO | 2013167907 A1 | 11/2013 |
|---|---|---|
| WO | 2014090684 A1 | 6/2014 |
| WO | 2014/195901 | 12/2014 |
| WO | 2014/203126 | 12/2014 |
| WO | 2014195901 A1 | 12/2014 |
| WO | 2014195902 A1 | 12/2014 |
| WO | 2014203126 A1 | 12/2014 |
| WO | 2014205523 A2 | 12/2014 |
| WO | 2015/019055 | 2/2015 |
| WO | 2015019055 | 2/2015 |
| WO | 2015019055 A1 | 2/2015 |
| WO | 2015140216 A1 | 9/2015 |
| WO | 2015193278 A1 | 12/2015 |
| WO | 2016120075 A1 | 8/2016 |

OTHER PUBLICATIONS

Third Party Observation dated Jun. 2, 2015 submitted to WIPO by Trond Ramsvik of Onsagers AS and directed towards WO2015/019055 (Ocado).
Exhibit 1001_U.S._10,294,025 B2.
Exhibit 1003_U.S._10,577,178 B2.
Exhibit 1004_Great_Britain_App_No._GB 1314313.
Exhibit 1009_Corrected_Norwegian_Patent_App_No._NO20140773.
Ex_1011_Corrected_PCT_App_Pub_No._WO2005077789.
Exhibit 1015_DS, Dec. 15, 2016.
Onsagers Letters to EPO dated Mar. 11, 2021 (1 page).
Abitz & Partner—Letter dated Mar. 15, 2021 (2 pages).
EPO Provisions of the Minutes and Decision dated Jun. 17, 2021 (144 pages).
EPO Preliminary Opinion dated Apr. 12, 2021 (3 pages).
Abitz & Partner—Written Submission dated Apr. 22, 2021 (12 pages).
Onsagers Written Submission dated Apr. 22, 2021 (18 pages).
Tharsus Written Submission dated May 21, 2021 (7 pages).
Ocado Solutions Written Submission dated May 21, 2021 (7 pages).
Annotated D13 Drawings filed May 21, 2021 (1 page).
Abitz & Partner Written Submission dated Jun. 14, 2021 (2 pages).
Onsagers Letter of Jan. 20, 2020 (18 pages).
Onsagers Letter of Feb. 6, 2018 (11 pages).
Mage Supporting Art. 123 (1 page).
Definition of Robot (5 pages).
Mages from D13 (3 pages).
Tharsus Written Submission dated Apr. 13, 2021 (13 pages).
Email of May 7, 2010.
X1-Comparison of P1 and PCT1.
X2-UK High COurt claim from Oct. 1, 2020.
X3_Document from NO entitlement Proceeding.
Abitz & Partner—Notice of Opposition Dec. 20, 2018.
Abitz & Partner—Notice of Opposition GROUNDS Dec. 20, 2018.
Abitz & Partner—Response to Onsagers reply Jun. 25, 2019.
Abitz & Partner—Observations to the Preliminary Opinion dated Apr. 16, 2020.
Abitz & Partner—Matters relating to Oral proceeding Apr. 16, 2020.
Abitz & Partner—letter of Mar. 10, 2021.
Abitz & Partner—letter of Feb. 10, 2021.
Abitz & Partner—attachemnt to letter of Feb. 10, 2021.
Abitz & Partner—attachment to letter of Mar. 10, 2021.
EPO Notice of Intervention Jan. 1, 2021.
EPO communicate summons Feb. 5, 2021.
EPO Preliminary Opinion Oct. 10, 2019.
Ocado Letter of Feb. 8, 2021.
Ocado Notice of Opposition Dec. 22, 2020.
Ocado Notice of Opposition GROUNDS Dec. 22, 2020.
Ocado Written Submission Feb. 17, 2021.
Onsagers Letter of Feb. 18, 2021.
Onsagers Reply to Opposition May 28, 2019.
Onsagers Written Submissions Apr. 16, 2020.
Onsagers Written Submissions Jan. 15, 2021.
Onsagers Written Submissions to intervention Feb. 3, 2021.
Tharsus letter of Feb. 9, 2021.
Tharsus letter of Dec. 22, 2020.
Tharsus Notice of Opposition Dec. 22, 2020.
Tharsus Notice of Opposition GROUNDS Dec. 22, 2020.
Tharsus Notice of Opposition second form Dec. 22, 2020.
Tharsus Written Submission Feb. 17, 2021.
Tharsus annex Feb. 17, 2021.
Pleading of Oct. 3, 2016 Oslo Tingrett (in Norwegian).
Complainants' Post-Hearing Brief, Sep. 14, 2021 (418 pages).
Respondents' Initial Post-Hearing Reply Brief, Sep. 16, 2021 (324 pages).
Respondents' Post-Hearing Reply Brief, Sep. 16, 2021 (169 pages).
Complainants' Reply Post-Hearing Brief, Sep. 23, 2021 (380 pages).
Autostore Public Complaint, Oct. 1, 2020.
Ocado's supplemental response to complainants' interrogatory, Feb. 2, 2021.
Respondents'joint disclosure of initial invalidity and unenforceability contentions, Feb. 16, 2021.
Appendix A-1 : Invalidity Claim Chart for U.S. Pat. No. 10,093,525.
Appendix A-2 : Invalidity Claim Chart for U.S. Pat. No. 10,093,525.
Appendix A-3 : Invalidity Claim Chart for U.S. Pat. No. 10,093,525.
Appendix B-1 : Invalidity Claim Chart for U.S. Pat. No. 10,494,239.
Appendix B-2 : Invalidity Claim Chart for U.S. Pat. No. 10,494,239.
Appendix B-3 : Invalidity Claim Chart for U.S. Pat. No. 10,494,239.
Appendix C-1 : Invalidity Claim Chart for U.S. Pat. No. 10,696,478.
Appendix C-2 : Invalidity Claim Chart for U.S. Pat. No. 10,696,478.
Appendix C-3 : Invalidity Claim Chart for U.S. Pat. No. 10,696,478.
Appendix D-1 : Invalidity Claim Chart for U.S. Pat. No. 10,474,140.
Appendix D-2 : Invalidity Claim Chart for U.S. Pat. No. 10,474,140.
Appendix D-3 : Invalidity Claim Chart for U.S. Pat. No. 10,474,140.
Appendix D-4 : Invalidity Claim Chart for U.S. Pat. No. 10,474,140.
Appendix E-1 : Invalidity Claim Chart for U.S. Pat. No. 10,294,025.
Appendix E-2 : Invalidity Claim Chart for U.S. Pat. No. 10,294,025.
Appendix E-3 : Invalidity Claim Chart for U.S. Pat. No. 10,294,025.
Appendix F-1 : Invalidity Claim Chart for U.S. Pat. No. 10,294,025.
Appendix F-2 : Invalidity Claim Chart for U.S. Pat. No. 10,093,525.
Appendix F-3 : Invalidity Claim Chart for U.S. Pat. No. 10,494,239.
Appendix F-4 : Invalidity Claim Chart for U.S. Pat. No. 10,696,478.
Appendix G : Claim Chart Comparing Claims of U.S. Pat. No. 10,577,178 with GB Appl. No. GB1314313.6.
Respondents' supplemental joint disclosure of initial invalidity and unenforceability contentions, Feb. 19, 2021.
Parties' Proposed Claim Constructions, Feb. 23, 2021.
Ocado Respondents' Amended Response to the Notice of Investigation and Complaint of complainant Autostore, Apr. 14, 2021.
Respondents Notice of Prior Art, Mar. 18, 2021.
AutoStore's Claim Form, Oct. 1, 2020.
AutoStore's Particulars of Claim, Oct. 1, 2020.
AutoStore's Particulars of Infringement, Oct. 1, 2020.
Ocado's Defence and Counterclaim, Dec. 14, 2020.
AutoStore's Response to Ocado's 1-2 Pt. 18 Request, Feb. 4, 2021.
Ocado's Grounds of Invalidity, Dec. 14, 2020.
AutoStore's Reply and Defence to Counterclaim, Jan. 25, 2021.
Ocado's Reply to Defence to Counterclaim, Feb. 9, 2021.
Annex 1 to Grounds of Invalidity, EVS Webpage, Dec. 20, 2014.
AutoStore's Response to Ocado's 2-5 Pt. 18 Request, Feb. 15, 2021.
Annex 2 to Grounds of Invalidity, Norwegian articles updated, Dec. 14, 2020.
Annex 3 to Grounds of Invalidity, Certificate, Dec. 14, 2020.
Statement of Case on Norwegian Law and Confidential Disclosure, Mar. 19, 2021.
Annex 4 to Grounds of Invalidity, Bank Bot design docs, Dec. 14, 2020.
Annex 5 to Grounds of Invalidity, Large Autostore Document, Dec. 14, 2020.
Annex A to Reply and Defence to Counterclaim, Jan. 25, 2021.
Joint Disclosure Review Document, Apr. 20, 2021.
Annex B to Reply and Defence to Counterclaim, Jan. 25, 2021.
Annex C to Reply and Defence to Counterclaim, Jan. 25, 2021.
Certified copy of priority document, PCT/EP2015/063415.
Appendix H : Chart of Evidence Supporting Respondents' Claim Constructions.

(56) References Cited

OTHER PUBLICATIONS

Ocado Group Plc's Petition for Inter Partes Review, Nov. 30, 2020.
Public Ocado Contingent Petition for Review of Final Initial Determination of No. Violation (104 pages).
Public Ocado Summary Contingent Petition for Review of Final ID of No. Violation (13 pages).
Public Initial Determination of Violation of Section 337 and RD on Remedy and Bonding (182 pages).
Public Autostore Summary of Petition for Commission Review (14 pages).
Public Autostore Petition for Commission Review (112 pages).
Exhibit 1001 U.S. Pat. No. 10,294,025 B2.
Exhibit 1001 Corrected U.S. Pat. No. 10,294,025.
Exhibit 1002 EDVA Complaint.
Annex A to Defence and Counterclaim, Dec. 14, 2020.
Annex B to Defence and Counterclaim, Dec. 14, 2020.
Annex C to Defence and Counterclaim, Dec. 14, 2020.
Annex D to Defence and Counterclaim, Dec. 14, 2020.
Exhibit 1003 Corrected U.S. Pat. No. 10,577,178.
Exhibit 1003 U.S. Pat. No. 10,577,178 B2.
Exhibit 1004 Corrected Great Britain Patent App No. GB1314313.
Exhibit 1004 Great Britain Patent App No. GB1314313.
Exhibit 1005 Corrected Great Britain Patent App Pub No. GB2520104.
Exhibit 1005 Great Britain Patent App Pub No. GB2520104.
Exhibit 1006 Corrected Complainants Statement on the public interest, Oct. 1, 2020.
Exhibit 1006 Complainants Statement on the public interest, Oct. 1, 2020.
Exhibit 1007 Corrected Espacenetnet Bibliographic Data page.
Exhibit 1007 Espacenetnet Bibliographic Data Page for PCT GB2014052273.
Exhibit 1008 Corrected Declaration of Brian Pfeifer, Ph.D, P.E, Nov. 30, 2020.
Exhibit 1008 Declaration of Brian Pfeifer, Ph.D, P.E, Nov. 30, 2020.
Exhibit 1009 Corrected Norwegian Patent App No. N020140//3.
Exhibit 1009 Norwegian Patent App No. 20140773.
Exhibit 1010 Corrected PCT App Pub No. WO2014195901.
Exhibit 1010 PCT App Pub No. WO2014195901.
Exhibit 1011 Corrected PCT App Pub No. WO2005077789.
Exhibit 1011 PCT App Pub No. WO2005077789.
Exhibit 1012 Corrected Applicant Remarks, Reply under 37 CFR 1.111, Sep. 27, 2018.
Exhibit 1012 Applicant Remarks, Reply under 37 CFR 1.111, Sep. 27, 2018.
Exhibit 1013 Certified Office Copy from the UK Intellectual Property Office, re GB1314313, Nov. 18, 2020.
Exhibit 1013 Corrected Certified Office Copy from the UK Intellectual Property Office, re GB1314313, Nov. 18, 2020.
Exhibit 1014 Corrected Final Action (USPTO), dated Dec. 18, 2018.
Exhibit 1014 Final Action (USPTO), dated Dec. 18, 2018.
Exhibit 1015 Corrected IDS, Dec. 15, 2016.
Exhibit 1015 IDS, Dec. 15, 2016.
Exhibit 1016 Corrected Notice of Allowance, dated Oct. 22, 2019.
Exhibit 1016 Notice of Allowance, dated Oct. 22, 2019.
Complaint from Ocado, Feb. 2, 2021.
Exhibit 12, The "Oslo District Court Pleading".
Exhibit 61, Reply and defence to counterclaim, in the High Court of Justice Business and Property Courts of England and Wales.
Exhibit 62, Import records.
Exhibit 63, Press release Haugesund Avis.
United States International Trade Commission Opinion dated Mar. 17, 2022 (27 pages).
Response to the Proprietors Grounds of Appeal issued in the counterpart European Patent Application No. 15730466.8, mailed on Mar. 20, 2022 (257 pages).
Response to the Proprietors Grounds of Appeal issued in the counterpart European Patent Application No. 15730466.8, mailed on Mar. 11, 2022 (69 pages).
Response to the Proprietors Grounds of Appeal issued in the counterpart European Patent Application No. 15730466.8, mailed on Mar. 11, 2022 (91 pages).
United States Patent and Trademark Office Before the Patent Trial and Appeal Board, Final Written Decision, U.S. Pat. No. 10,294,025 B2, Public Version, dated Jun. 28, 2022 (76 pages).
Guzior Letter mailed Aug. 10, 2021 (2 pages).
PTAB—Paper 12, Dated Jun. 3, 2021 (45 pages).
Autostore's Further Response to Ocado's 2-5 Pt. 18 Request, Feb. 18, 2021.
Office Action issued in Canadian Application No. 2948981 dated Aug. 8, 2022 (7 pages).
Abel & Imray, Observations in response to Proprietors submission in European Application No. 17180476.8 mailed Oct. 10, 2022 (10 page).
Autostore's Reply to the Filed Opposition to EP Pat # 3257790 mailed on Sep. 21, 2022 (18 pages).
Notice of Opposition issued in European Application No. 17180476.8 mailed on May 3, 2022 (39 pages).
Office Action issued in European Application No. 21172165.9 dated Aug. 25, 2022 (5 pages).
Office Action issued in European U.S. Appl. No. 21172166.7 dated Aug. 25, 2022 (4 pages).
Observations issued in European Application No. 211721171.7 mailed on Jun. 20, 2022 (173 pages).
Information about non relevance of TPO (1 page).

REMOTELY OPERATED VEHICLE FOR A STORAGE SYSTEM

CROSS-REFERENCE TO RELATED APPLICATIONS

This is a Continuation Application under 35 U.S.C. § 120 of application U.S. Ser. No. 15/978,219 filed 14 May 2018, which is a Continuation of application U.S. Ser. No. 15/319,103 filed 15 Dec. 2016, now U.S. Pat. No. 10,294,025 issued 21 May, 2019, which is a US National Stage application of PCT/EP2015/063415 filed 16 Jun. 2015.

FIELD OF THE INVENTION

The present invention relates to automated storage systems of the type comprising a storage facility having a plurality of storage columns arranged in a grid, with a plurality of storage bins arranged in vertical stacks in the storage columns. In particular the invention relates to a remotely operated vehicle assembly for picking up storage bins from a storage system.

BACKGROUND OF THE INVENTION

A remotely operated vehicle for picking up storage bins from a storage system is known. A detailed description of a relevant prior art storage system is presented in WO 98/49075, and details of a prior art vehicle being suitable for such a storage system is disclosed in Norwegian patent NO317366. Such a prior art storage system comprises a three dimensional storage grid containing storage bins that are stacked on top of each other up to a certain height. The storage grid is normally constructed as aluminium columns interconnected by top rails, and a number of remotely operated vehicles, or robots, are arranged to move laterally on these rails. Each robot is equipped with a lift for picking up, carrying, and placing bins that are stored in the storage grid, and a rechargeable battery in order to supply electrical power to a robot incorporated motor. The robot typically communicates with a control system via a wireless link and is recharged at a charging station when needed, typically at night.

An example of a prior art storage system is illustrated in FIG. 1. The storage system 3 includes a plurality of vehicles or robots 1 configured to move on dedicated supporting rails 13 and to receive a storage bin 2 from a storage column 8 within a bin storing grid 15. The prior art storage system 3 may also include a dedicated bin lift device 50, the latter being arranged to receive a storage bin 2 from the robot 1 at the top level of the storage system 3 and to convey the storage bin 2 down in a vertical direction to a delivery station, or port 60.

However, with this known system each vehicle assembly is covering a cross section of the underlying storage system that corresponds to two storage columns, thereby limiting the maximum number of simultaneously operating vehicles.

It is thus an object of the present invention to provide a vehicle assembly, a storage system and a method for operating such a vehicle assembly that allows a significant increase in the number of simultaneously operating vehicles during successful handling of storage bins.

BRIEF SUMMARY OF THE INVENTION

The present invention is set forth and characterized in the main claims, while the dependent claims describe other characteristics of the invention.

In particular, the invention concerns a remotely operated vehicle assembly being suitable for picking up storage bins from a storage system. The vehicle assembly comprising a vehicle body displaying a cavity being suitable for receiving a storage bin stored within the storage system, a vehicle lifting device being connected at least indirectly to the vehicle body and suitable for lifting the storage bin into the cavity, a displacement arrangement comprising inter alia a displacement motor which is configured to at least provide the power that is necessary in order to displace one or both of the first set of vehicle rolling means and the second set of vehicle rolling means between a displaced state where the relevant vehicle rolling means is displaced away from the underlying storage system during use, and a non-displaced state where the relevant vehicle rolling means is in contact with the underlying storage system during use, and driving means coupled to the displacement arrangement. The driving means further comprises a first set of vehicle rolling means connected to the vehicle body allowing movement of the vehicle along a first direction (X) within the storage system during use and a second set of vehicle rolling means connected to the vehicle body allowing movement of the vehicle along a second direction (Y) in the storage system during use, wherein the second direction (Y) is perpendicular to the first direction (X). The motor providing the necessary power to drive the vehicle assembly in the X or Y direction may be one or more dedicated motors and/or the displacement motor. The vehicle assembly is further characterized in that the displacement motor is situated in a lateral plane above the cavity, and further configured to generate a power that is converted by the remaining components of the displacement arrangement to a vertically directed pressure force acting on the first or second set of vehicle rolling means. The lateral plane is hereinafter defined as any planes which are arranged parallel to the plane set up by the first (X) and second (Y) direction. Furthermore, the vertical direction, or Z-direction, is defined as the direction perpendicular to the lateral plane. The delimitation of the cavity may be set by dedicated plates and/or by the surrounding components constituting the displacement arrangement and the driving means.

In an advantageous embodiment the transfer of power or force from the displacement motor to the corresponding vehicle rolling means is performed by means of at least one lever arm configured to allow mechanical alternation between the displaced state and the non-displaced state.

In another advantageous embodiment at least one of the vehicle rolling means comprises a first part and a second part being arranged at opposite facing side walls of the vehicle body and a vertically displaceable bar rigidly interconnecting the first part and the second part above the cavity, or at least at an upper half of the vehicle body. The bar may advantageously be arranged parallel to the before mentioned lateral plane.

In another advantageous embodiment the displacement arrangement comprises at least one lever arm configured to abut the vertically displaceable bar during operation of the displacement motor. Said at least one lever arm may be arranged at least partly below the vertically displaceable bar, at the side or above the cavity. The area where the lever arm abuts the bar is preferably at or near the arms' longitudinal midpoint. The term 'at least partly below' signifies an arrangement of the level arm that results in an abutment point positioned below the bar relative to any underlying storage system. The at least one lever arm may advantageously be arranged at an upper half of the vehicle body. Furthermore, they may be arranged either above or along the sides of the cavity, or both.

In another advantageous embodiment the two ends of each lever arm are arranged on each lateral side of an impact area of the lever arm from which the vertically directed pressure force on the vehicle rolling means forms during the operation of the displacement motor, and thereby achieving controlled displacement of the vehicle rolling means.

In another advantageous embodiment a first end of each lever arm is connected to a first rotatable device within an upper part of the vehicle body, for example a rotatable bolt, thus defining a lever arm fulcrum, and a second end of each lever arm is at least indirectly connected to the displacement motor allowing the rotation of the lever arm around its fulcrum at the first end. This rotation causes the desired vertical displacement of the vehicle rolling means.

In another advantageous embodiment the displacement arrangement further comprises at least one locking means, for example an elongated hook, where each locking means is pivotally connected to its corresponding lever arm at or near the second end and a second rotatable device situated at the upper half of the vehicle body, wherein the locking means and the second rotatable device are interconnected to allow releasable blocking after a predetermined angular rotation performed by the displacement motor.

In another advantageous embodiment at least one of the locking means is connected to a rotor of the displacement motor which enforces a rotating movement of the connected locking means, thereby causing the desired vertical displacement of the at least one of the first set of vehicle rolling means and the second set of vehicle rolling means relative to any underlying storage system.

In another advantageous embodiment the vehicle assembly further comprises at least one driving motor situated at the lateral plane above the cavity, the driving motor being arranged to drive at least one of the first set of vehicle rolling means and the second set of vehicle rolling means along the lateral plane of any underlying storage system set up by the first (X) and second (Y) directions. The change of direction of the vehicle assembly is preferably discrete. i.e. constituting a 90 degrees turn.

In another advantageous embodiment at least one of the vehicle rolling means comprises a first part and a second part that are arranged at opposite facing side walls of the vehicle body and a vertically displaceable bar rigidly interconnecting the first part and the second part at a lateral plane above the cavity, wherein at least one of the first and second part further comprises an upper rotating unit and a lower rotating unit, the upper and lower rotating units being interconnected by a cord rendering simultaneous rotation of the units possible. At least one of the upper and lower rotating units may be wheels, belts, etc. Furthermore, the cord may comprise any elongated object that allows said simultaneous rotation. The lower rotating unit is configured to at least indirectly contact the underlying storage system during use. The lower rotating unit may advantageously comprise two laterally spaced apart wheels configured to cause releasable contact with the underlying storage system during use, i.e. when the vehicle assembly is set in a non-displaced state.

In one embodiment the interconnecting cord is encircling both the lower and upper rotating unit.

In an alternative embodiment the interconnecting cord is encircling the upper rotating unit but arranged outside the lower rotation unit. The latter configuration may be achieved by means of additional wheels around which the cord is encircling. The assembly of the cord and the additional wheels should then be configured to create a stable pressure onto the lower ration unit, for example by use of two smaller wheels arranged adjacent to each wheels of the lower rotating unit, and where the cord is guided between the larger wheels and the additional wheels. This embodiment is considered more advantageous since it ensures a better contact between the lower rotation unit and the underlying storage system during use.

In another advantageous embodiment at least one of the vehicle rolling means comprises a first part and a second part being arranged at opposite facing side walls of the vehicle body, where the first and second part is rigidly connected to a first and second displacement plate, respectively, and a vertically displaceable bar at a lateral plane above the cavity rigidly connecting the first and second displacement plate.

In another advantageous embodiment all components contributing to the vertical displacement of the vehicle rolling means and the operation of the lifting device are arranged above the cavity, and all components contributing to the lateral movement of the vehicle assembly are either arranged above the cavity or within the volume limited by the spatial distribution of the parts of the vehicle rolling means contacting an underlying storage system during operation or a combination thereof.

The invention also concerns a storage system suitable for storage of bins. The storage system comprises a remotely operated vehicle assembly in accordance with any of the configurations described above, a vehicle support comprising a plurality of crossing supporting rails and a bin storing structure supporting the vehicle support. The structure comprises a plurality of storage columns, wherein each storage columns is arranged to accommodate a vertical stack of storage bins.

In an advantageous embodiment the plurality of crossing supporting rails are of type double track rails comprising a first and second X-rail in the first direction (X) and a third and fourth Y-rail in the second direction (Y).

In another advantageous embodiment the lateral cross sectional area of the remotely operated vehicle assembly occupies at most the lateral cross sectional area of the storage column within the bin storing structure, where the lateral cross sectional area of the storage column corresponds to the lateral area limited by the distance from one supporting rail to the closest parallel supporting rail in each direction, the distance being measured from the centre line of each rails.

The invention also concerns a method which is suitable for changing direction of a remotely operated vehicle assembly when operated on a storage system. The vehicle assembly comprises a vehicle body displaying a cavity for receiving a storage bin within the storage system, a vehicle lifting device connected at least indirectly to the vehicle body being suitable for lifting the storage bin into the cavity, a displacement arrangement comprising a displacement motor and driving means comprising a first set of vehicle rolling means connected to the vehicle body allowing movement of the vehicle along a first direction (X) within the storage system during use and a second set of vehicle rolling means connected to the vehicle body allowing movement of the vehicle along a second direction (Y) in the storage system during use, the second direction (Y) being perpendicular to the first direction (X). The method is characterized by the following step:
  rotate at least one lever arm by operating the displacement motor, where the displacement motor is situated near the upper lateral plane, or above, the cavity and vertically displacing one of the first set of vehicle rolling means and the second set of vehicle rolling means by exerting a pressure force on the vehicle rolling means in the vertical direction, away from any underlying storage system, by means of the rotating lever arm.

In an advantageous embodiment the remotely operated vehicle assembly used in the disclosed method is a vehicle in accordance with any of the configurations mentioned above.

In the following description, numerous specific details are introduced to provide a thorough understanding of embodiments of the claimed vehicle, system and method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

DETAILED DESCRIPTION OF THE INVENTION

Hereinafter all relative terms used to describe the inventive robot such as upper, lower, lateral, vertical, X-direction, Y-direction, Z-direction, etc, shall be interpreted using the above mentioned prior art storage system as reference system. Note also that a robot is herein considered to be a particular type of a remotely operated vehicle.

Figure 2:
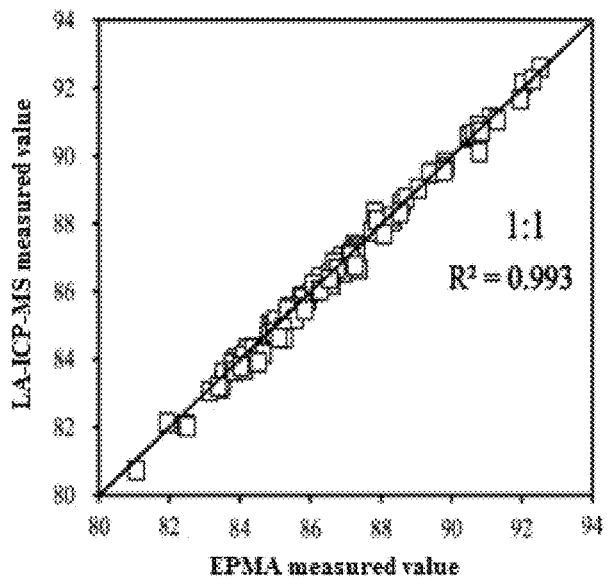
FIG. 2 is a perspective view of a remotely operated vehicle according to a first embodiment of the invention.
Figure 3:
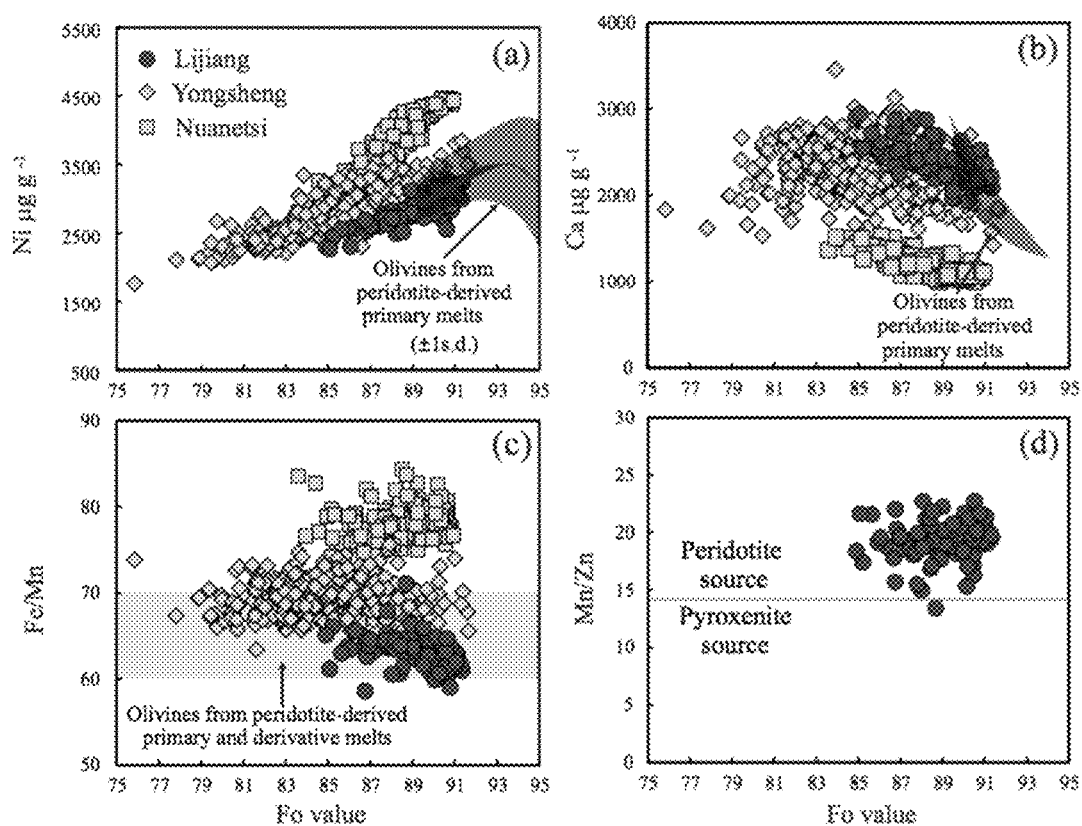
FIG. 3 is a perspective view of the remotely operated vehicle of FIG. 2 observed from a different angle.
Figure 4:
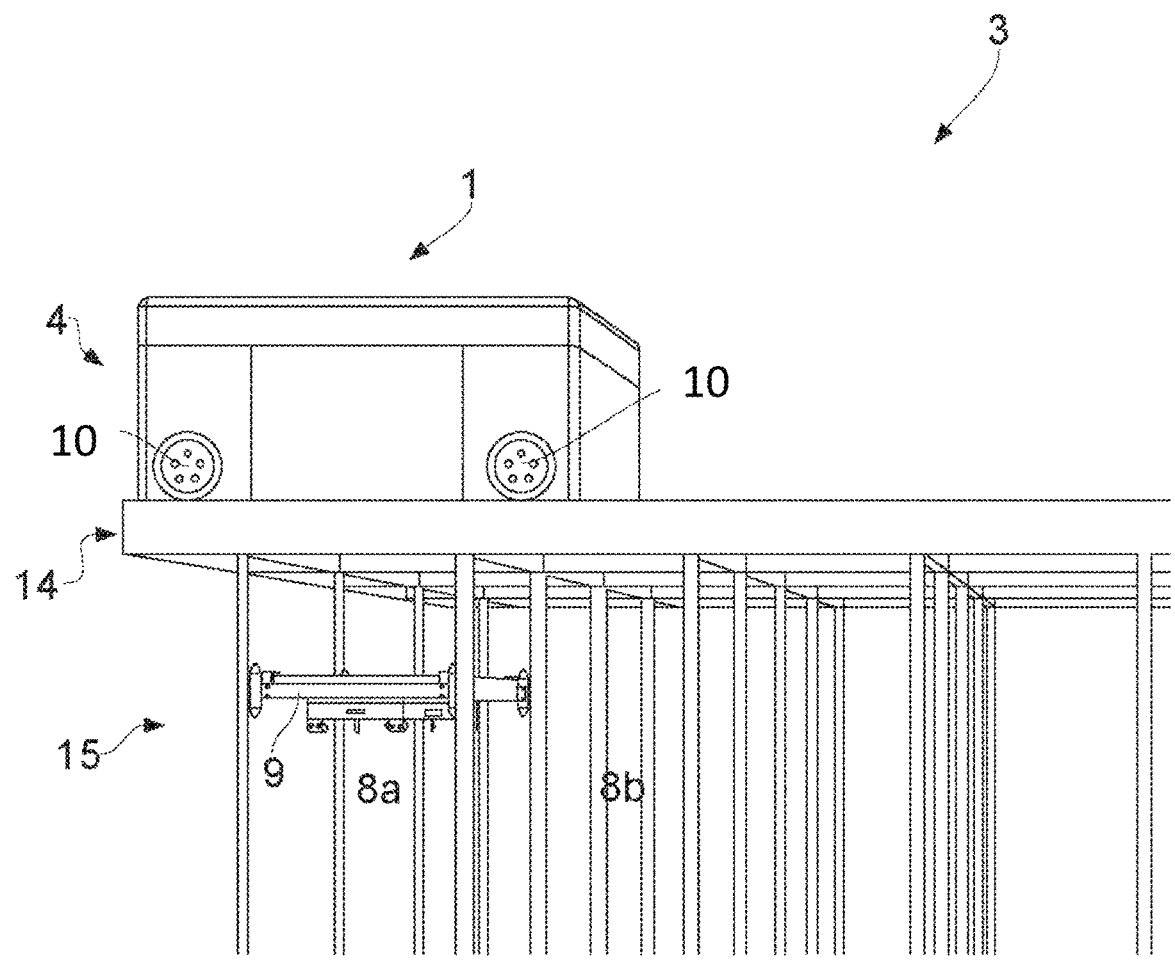
FIG. 4 is a perspective view of part of a storage system in accordance with a first embodiment of the invention including a bin storing grid, a vehicle support and a remotely operated vehicle.

FIGS. 2 and 3 give perspective views in two different angles of a robot 1 in accordance with a first embodiment of the invention comprising a rectangular vehicle body or framework 4 displaying a cavity 7 centrally arranged there within, a top cover 72 covering the top part of the body 4, a first set of four wheels 10 mounted inside the cavity 7 and a second set of four wheels 11 mounted at the exterior walls of the body 4. The first and second set of wheels 10,11 are oriented perpendicular to each other. For the sake of clarity a Cartesian coordinate system is shown with its X, Y and Z axes aligned along the principal directions of the rectangular vehicle body 4. The size of the cavity 7 is adapted to at least contain the largest storage bin 2 intended to be picked up by the robot 1, and preferably also a vehicle lifting device 9 (FIG. 4). The lateral area, i.e. along the X and Y directions, may be of any size relative to the prior art storage system, for example less than the lateral area of an underlying storage column 8a, exactly matching the lateral area of the underlying storage column (see additional embodiment below) and extending beyond the lateral area of the underlying storage column 8a, either in one direction only (Y direction in FIG. 4) or in both directions.

FIG. 4 shows a part of a storage system 3 where the robot 1 is in a lifting position on a vehicle support 14, directly above a storage column 8,8a within a supporting bin storing structure 15. A vehicle lifting device 9 is lowered a distance into the storage column 8,8a in order to hook onto, and lift up, any storage bin 2 within the column 8. The reference numerals 8a and 8b refer to a central storage columns 8a situated directly below the robot 1 and to an adjacent storage column 8b situated adjacent to the central storage column 8a.

Figure 5:
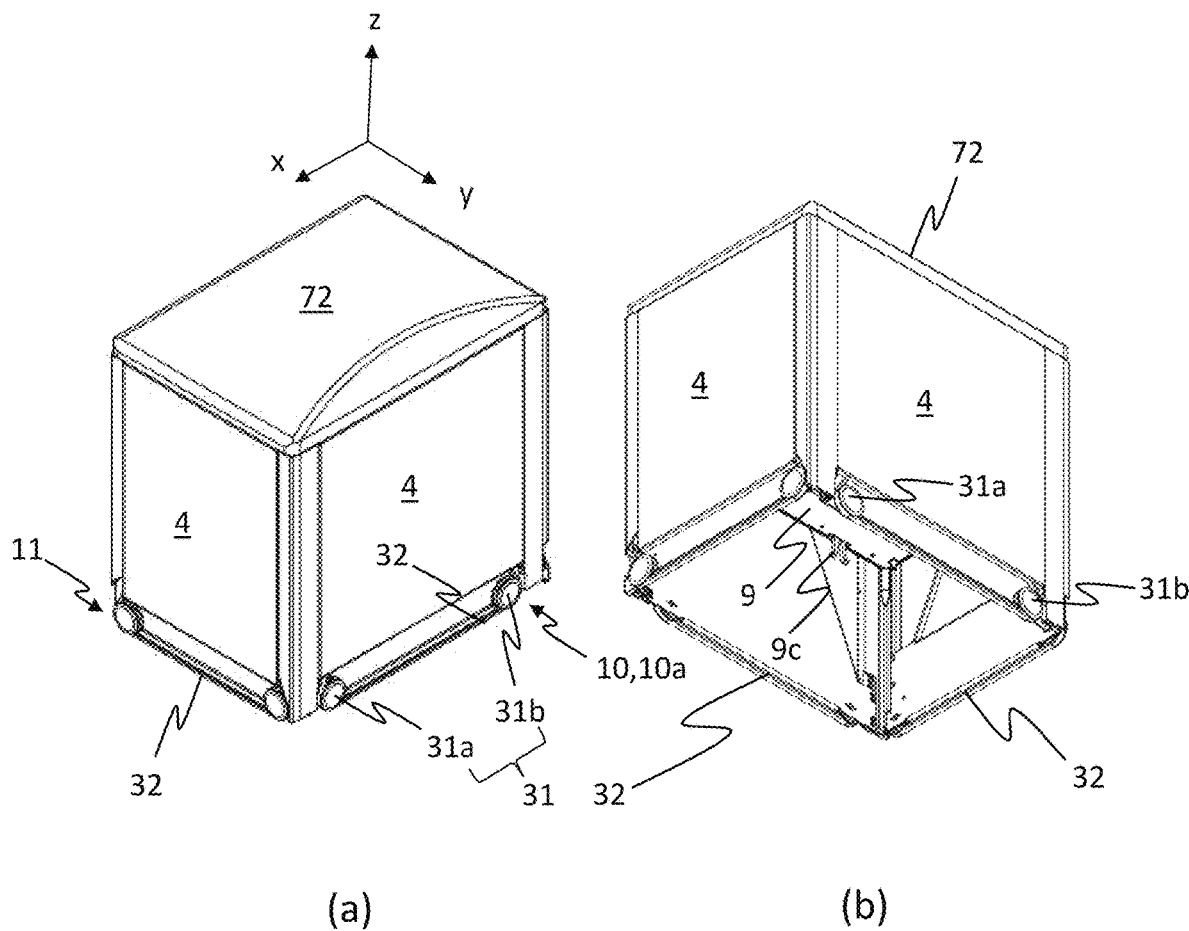
FIGS. 5 (a) and (b) are perspective views observed from two different angles of a remotely operated vehicle according to a second embodiment of the invention.
Figure 6:
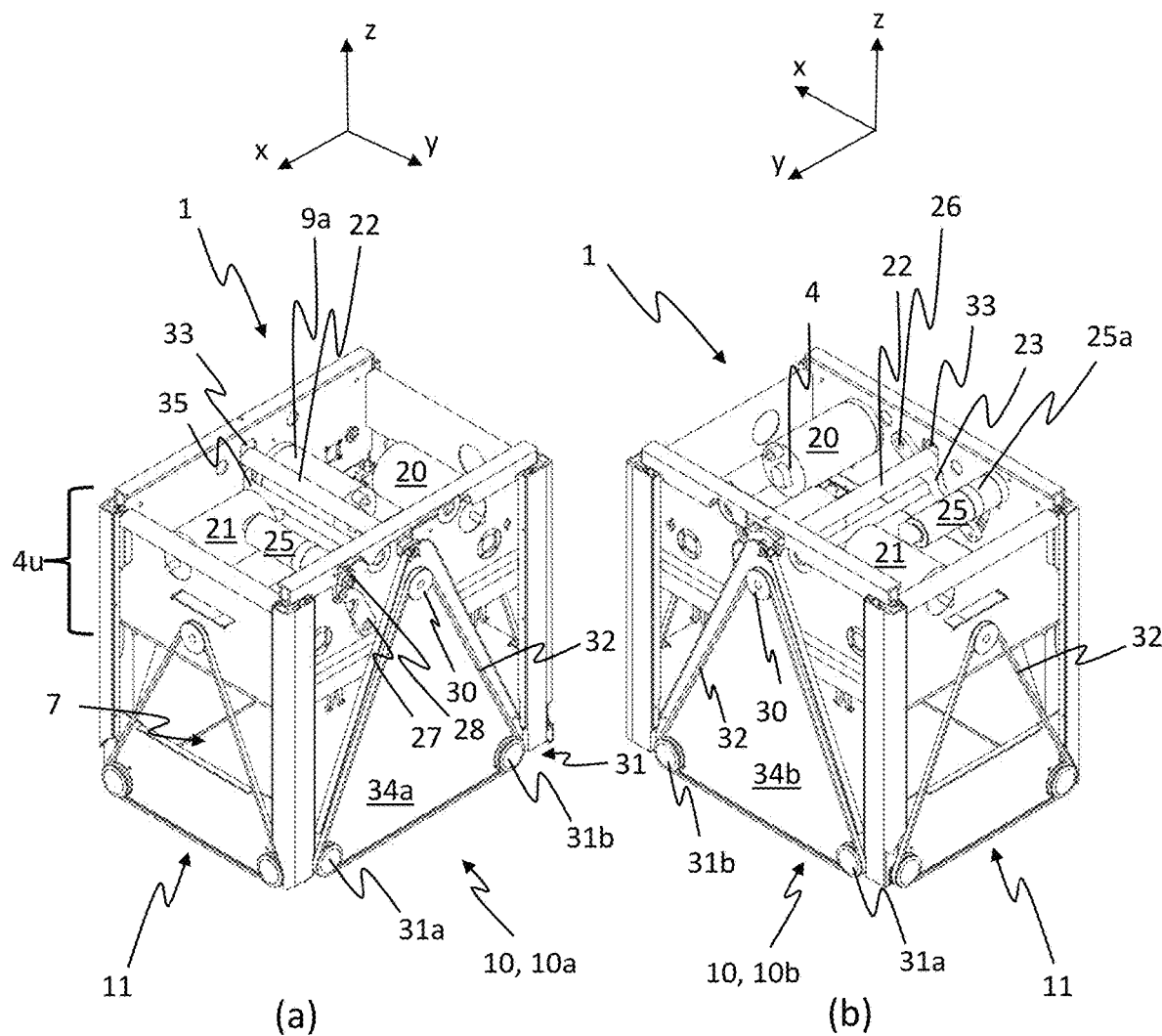
FIGS. 6 (a) and (b) are perspective views observed from two different angles of the remotely operated vehicle of FIG. 5, where exterior side walls and top lid have been removed.

FIGS. 5 and 6 (a) and (b) show the inventive robot 1 in accordance with a second embodiment of the invention. In FIG. 6 the side walls and the top cover 72 have been removed in order to better illustrate all relevant components, in particular related to the wheel displacement arrangement 23-28 and the driving means 10,11. A Cartesian coordination system (X,Y,Z) has been added for the sake of clarity. As in the first embodiment shown in FIGS. 2 and 3 the driving means 10,11 comprises a first set of vehicle rolling means 10 and a second set of vehicle rolling means 11 configured to move the robot 1 along the top of a storage system 3 in the X and Y direction, respectively. Each set 10,11 are composed of two wheel parts 10a,10b arranged along opposite facing side walls of the framework 4, where at least one set 10,11 may be displaced vertically.

As seen in FIG. 6, the wheel parts 10a,10b further comprises a master wheel 30 arranged at an upper part 4u of the framework 4 and slave wheels 31 comprising two slave wheels 31a,31b arranged at, or near, each of the two corners of the lower edge of the framework 4. The slave wheels 31a,31b constitute the conventional driving wheels contacting, directly or indirectly, the underlying storage system 3 during use. The three wheels 30,31a,31b of each four wheel parts are interconnected by an at least partly encircling belt or cord 32, ensuring a simultaneous rotation of each slave wheels 31a,31b when the master wheel 30 is set in operation by one or more drive units 20,21.

In order to lift the slave wheels 31,31a,31b from the storage system 3 during change of direction of the robot 1, one or more vertically displaceable bars 22 is/are mounted above the cavity 7 interconnecting a first and second displacement plate 34a,34b positioned along opposing side walls of the framework 4, i.e. along the y direction. Each displacement plate 34a,34b rigidly connects the master wheel 30, the slave wheels 31 and the belt 32 in the x-z plane, where the master wheel 30, the slave wheels 31 and the belt constitute the first part of the vehicle rolling means 10a With this particular configuration any displacement of the bar 22 thus result in a rigid displacement of the connected driving means 10. FIG. 6 shows a configuration where only the first set of vehicle rolling means 10 is displaceable by the bar 22. However, it is clear for the skilled person that alternative configurations are possible where the second set of vehicle rolling means 11 may be displaced instead of, or in addition to, the first set of vehicle rolling means 10, without deviating from the main purpose of the invention.

Figure 7:
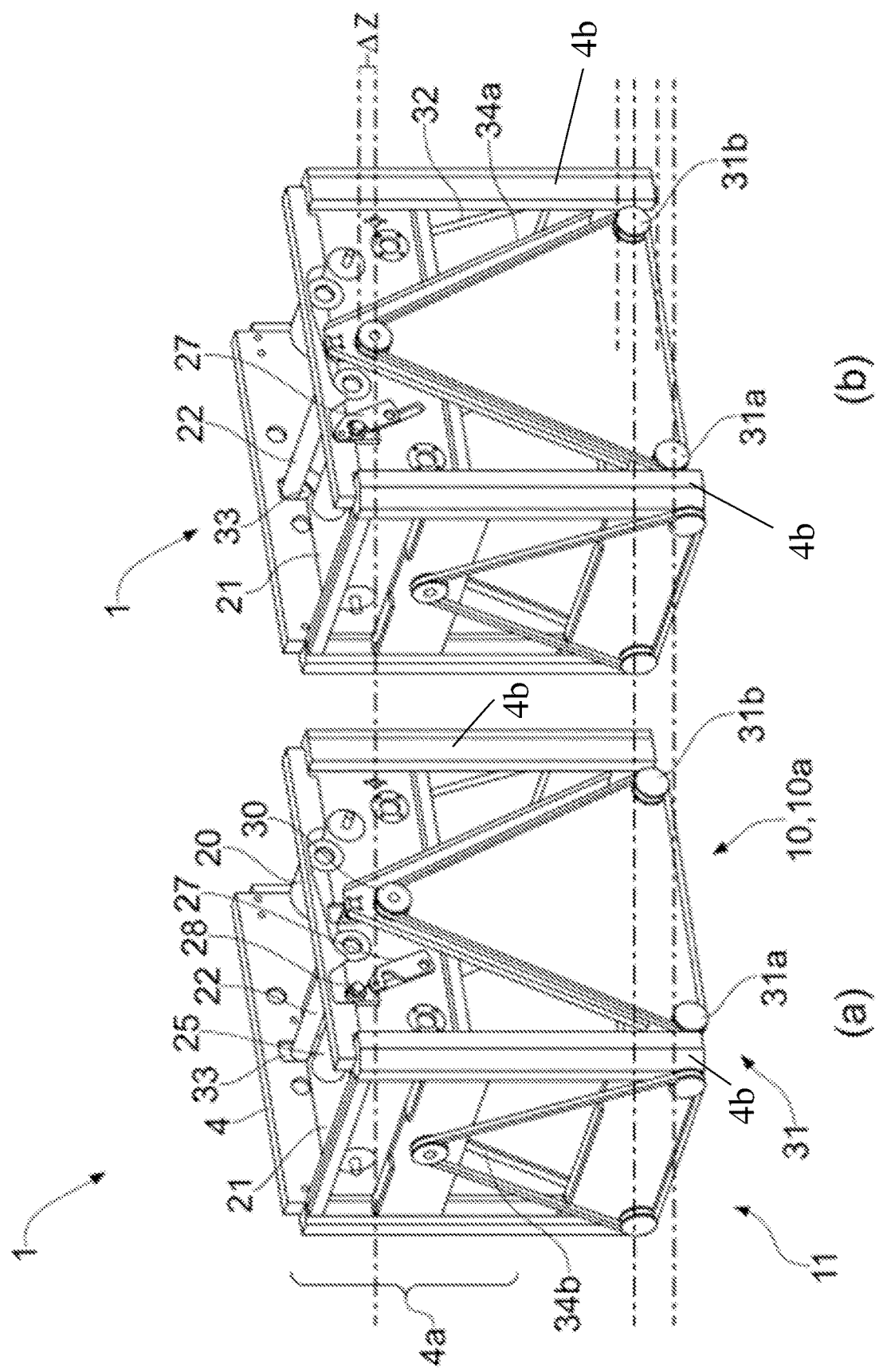
FIGS. 7 (a) and (b) are perspective views of a remotely operated vehicle according to FIGS. 5-6, where one of the set of wheels are in its operational (lower) position and in its non-operational (elevated) position, respectively.

The displacement of the bar 22 may be achieved by means of a lever arm 23 configured to exert an upward directed pressure force activated by a displacement motor 25,25a, thereby pushing the bar 22 vertically. To ensure high predictability during displacement, the bar 22 can be arranged and guided within suitable slots 33 having a width being slightly larger than the diameter of the bar 22 and a length being equal or slightly longer than the total displacement length (Δz) (FIG. 7). The end of the lever arm 23 is mounted on a rotatable bolt 26 situated at one lateral side of the bar 22, thus defining a fulcrum 26. The lateral distance between the fulcrum 26 and the bar 22 may for example be half the length of the lever arm 23.

Figure 8:
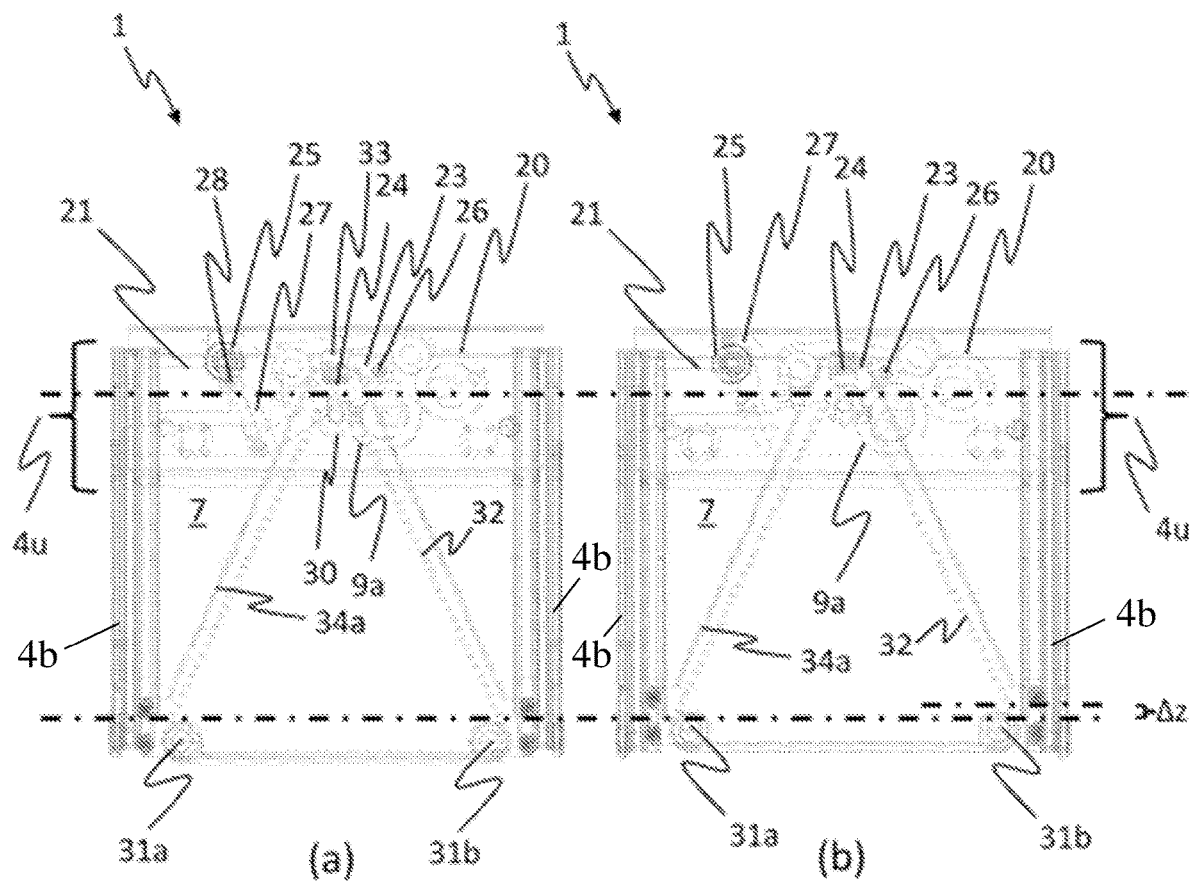
FIGS. 8 (a) and (b) are cross-sectional, transparent views of the remotely operated vehicle according to FIGS. 5-7 where one of the set of wheels is in its operational position and in its non-operation position, respectively.

The rotational mechanism of the lever arm 23 may be situated at the opposite lateral side of the bar 22 relative to the fulcrum 26. This particular embodiment is illustrated in FIGS. 5-8. With reference to FIGS. 6 and 7 the rotational mechanism comprises a displacement motor 25 (for example a DC motor) having a rotor 25a, a lever arm wheel 28 attached to the rotor 25a, a locking arm 27 attachable in one end to the lever arm wheel 28 and attached in the other end to the end of the lever arm 23 opposite to the fulcrum 26. The locking arm 27 is configured to at least partly enclose the lever arm wheel 28 when the lever arm 23 is rotated into its upper position, i.e. the position where the bar 22 has been pushed up to its uppermost position; thereby blocking any vertical movements of the lever arm 23 that is not caused by controlled operation of the displacement motor 25. FIGS. 7(b) and 8(b) show the situation where the locking arm 27 is in its upper position.

The rotation of the lever arm 23 may alternatively be operated by a displacement motor arranged at its fulcrum 26.

In yet an alternative configuration the rotation of the lever arm 23 may be operated by arranging a suitable displacement motor both at its fulcrum 26 and at or near the opposite end of the lever arm 23.

FIGS. 7, 8 (a) and FIGS. 7, 8 (b) illustrate the robot 1 with its master and slave wheels 30,31 in their non-displaced and displaced state, respectively. In the figures, Δz signifies the displacement length of the driving means 10 after a successful wheel displacement. The dotted lines are added in order to better indicate the actual wheel positions. For example, the upper dotted line pair in FIG. 7 shows the change in position of the master wheel 30. The two dotted lower line pairs in FIG. 7 show the corresponding change in position of the two slave wheels 31 being vertically guided with at least two vertical beams 4b arranged in corners of the vehicle body or framework 4. Additionally, the at least two vertical beams 4b may form parts of the vehicle body or framework 4.

Figure 9:
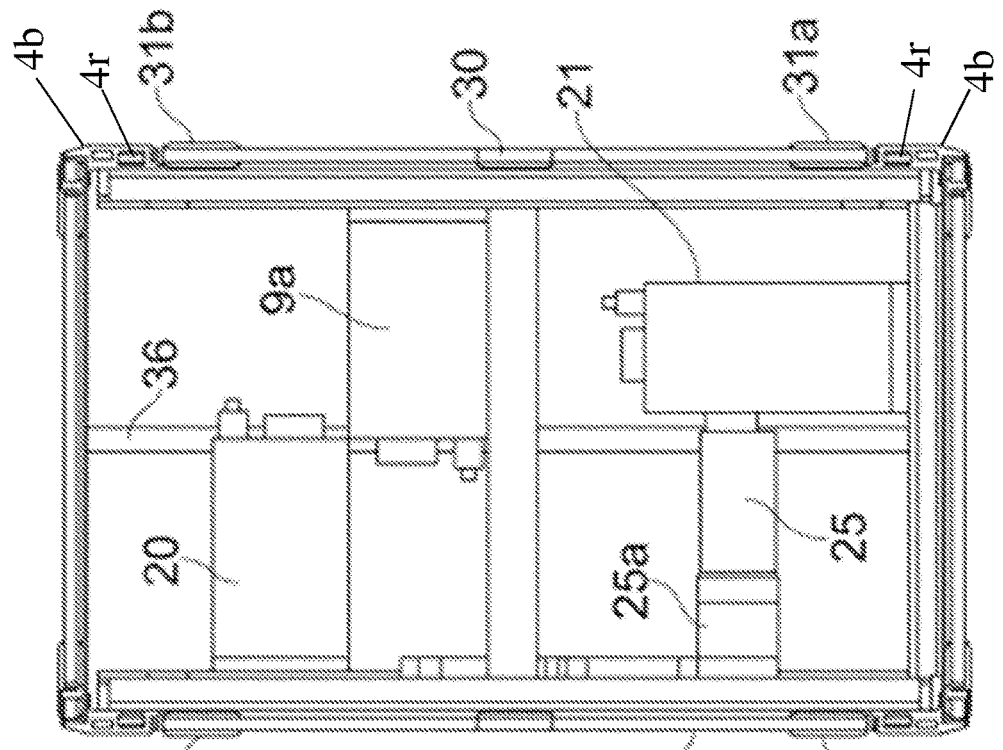
FIGS. 9 (a) and (b) are views of the remotely operated vehicle according to FIGS. 5-8 seen from below and above, respectively.
Figure 9:
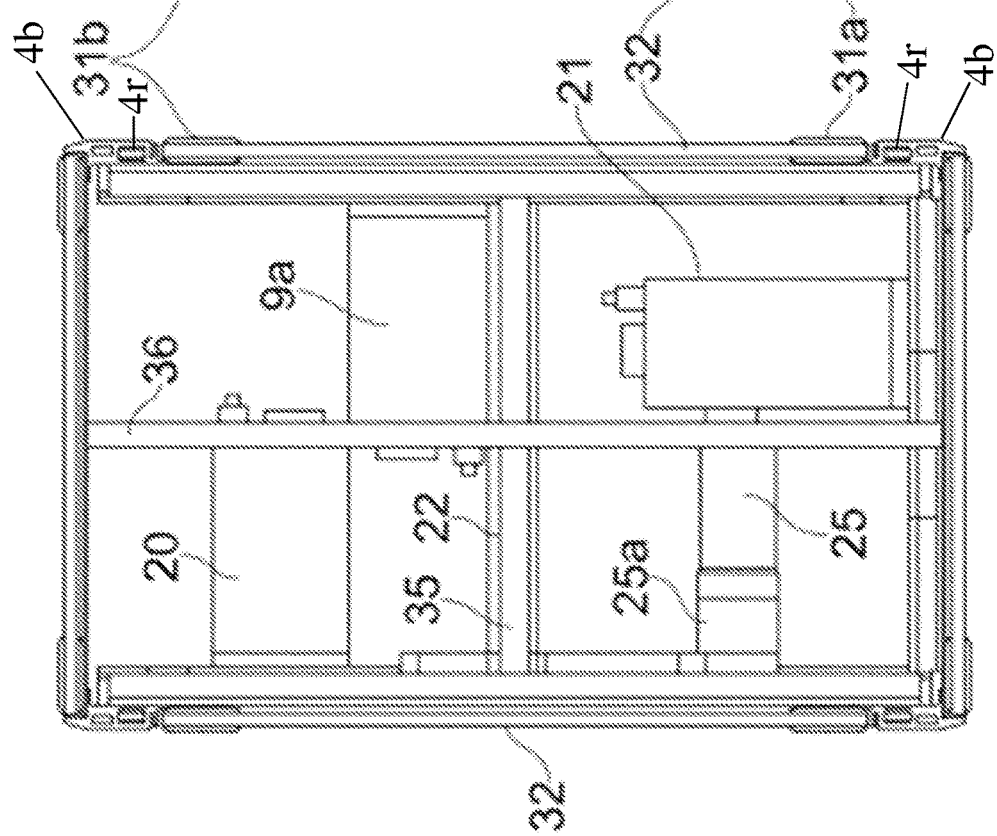

FIGS. 9 (a) and (b) shows the stripped robot 1 from below and above, respectively. The before mentioned displacement motor 25 with its rotor 25a is shown at the lower left side. The driving motors 20,21 for driving the robot in the X and Y directions are shown at the upper left side and lower right side, respectively, and the vehicle lifting device motor 9 a is shown at the upper right side. At least one of the motors 9a,20,21 is preferably a DC motor. Each driving motor 20,21 is operating a drive shaft 35,36, which again is connected at their ends to the opposite facing master wheels 30, thereby providing transmission of rotational force to the slave wheels 31 via belts 32. Additionally, a vertical recess 4r is featured in each of the at least two vertical beams 4b to aid in vertically guiding the two slave wheels 31 along the at least two vertical beams 4b.

Figure 10:
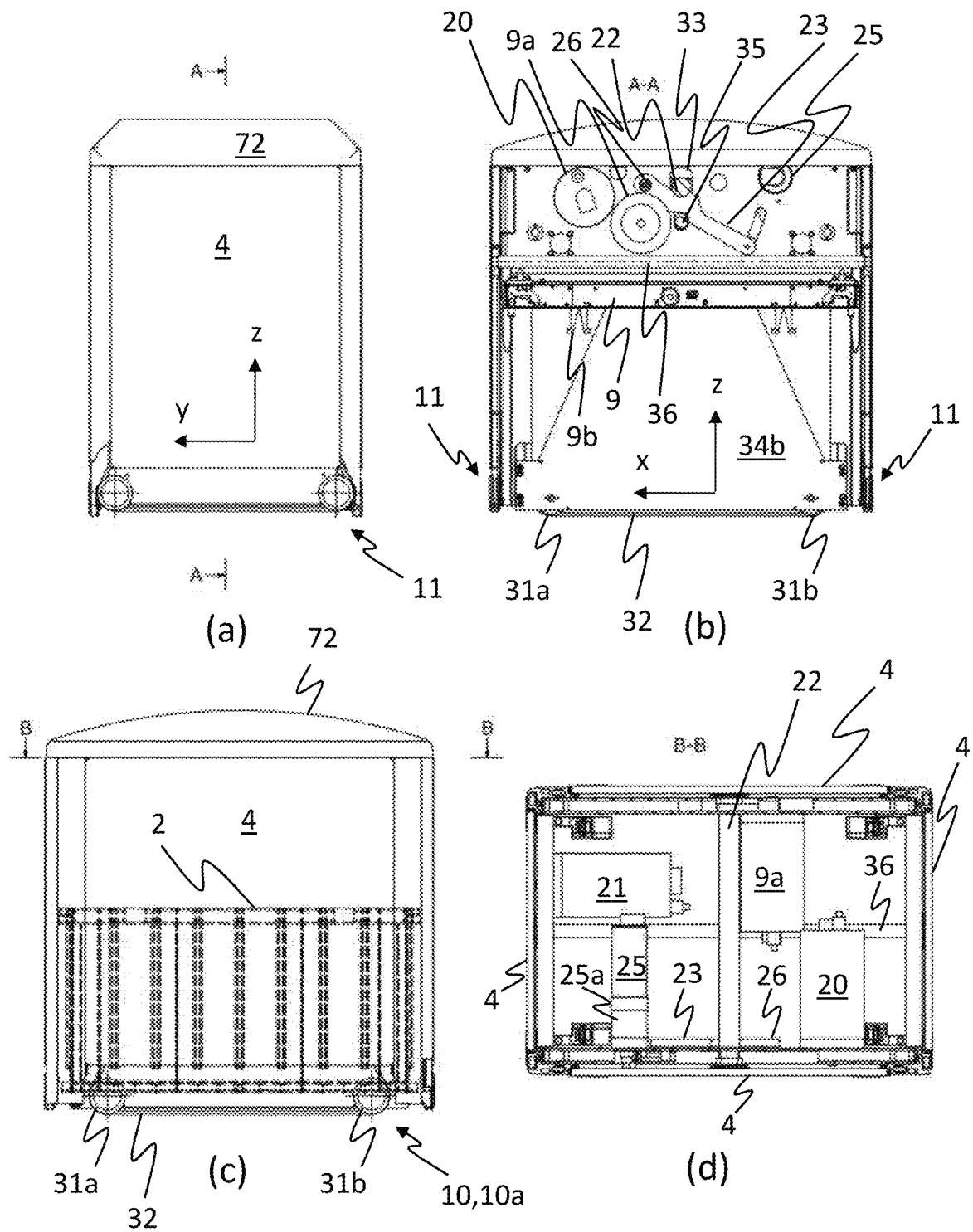
FIGS. 10 (a) to (d) are side views of the remotely operated vehicle according to FIGS. 5-9, where FIG. 10 (a) shows the vehicle seen along x direction with casing, FIG. 10 (b) shows a cross section of the vehicle along the section A-A of FIG. 10 (a), FIG. 10 (c) shows a partly transparent side view of the vehicle along the y direction and FIG. 10 (d) shows a cross section of the vehicle along the section B-B of FIG. 10 (c)
Figure 11:
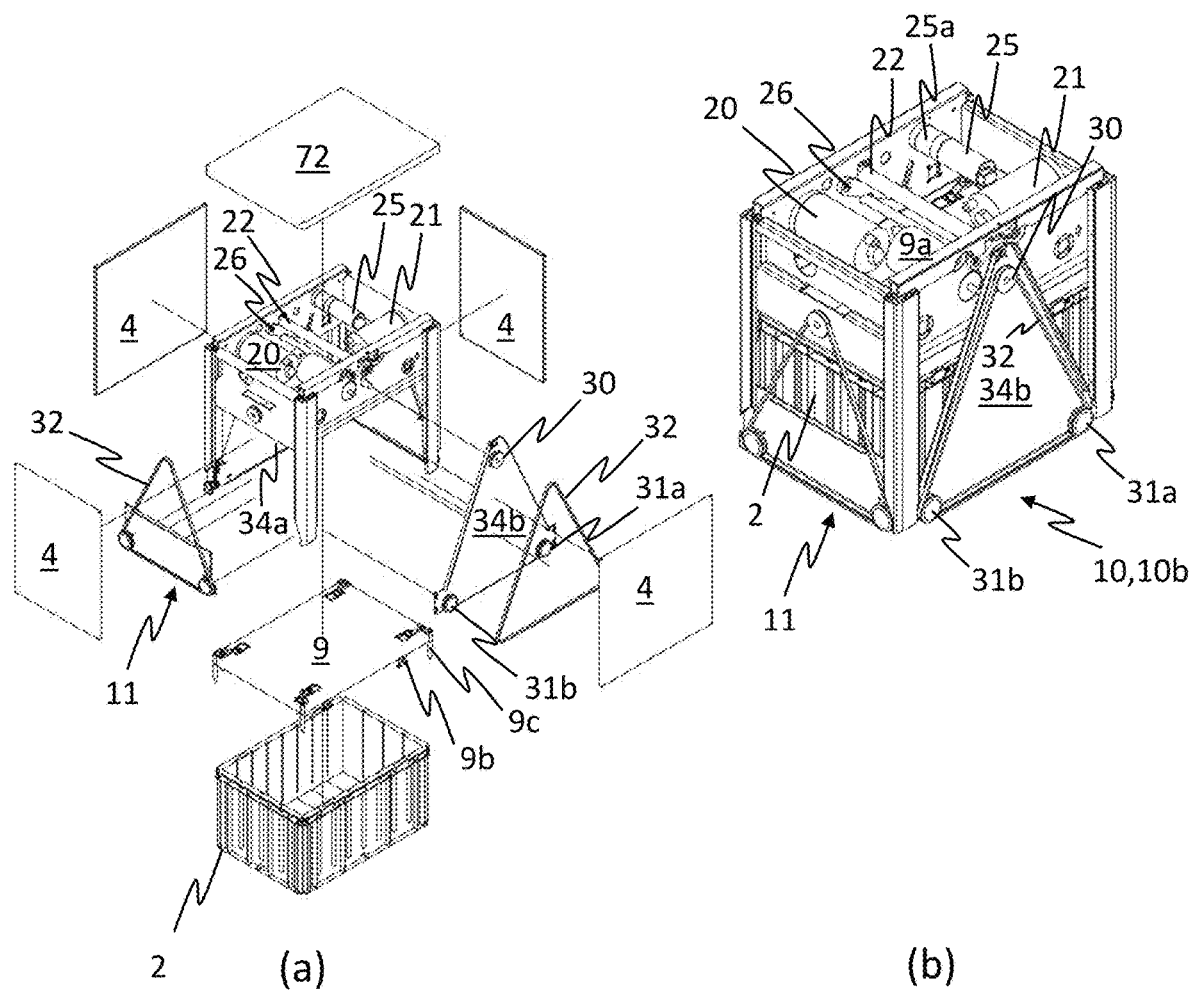
FIGS. 11 (a) and (b) are perspective views of the remotely operated vehicle according to FIGS. 5-10 showing the vehicle in an exploded and non-exploded view drawing, respectively.

FIGS. 10-11 show other illustrations of the vehicle in accordance with the second embodiment.

A vehicle with a top cover 72 (non-removable or removable) and a vehicle body 4 covering all sides in the X,Y directions is shown in FIGS. 10 (a) and (b) observed along x direction and y direction respectively.

In the partly transparent illustration in FIG. 10 (c) a storage bin 2 may be seen arranged fully within the cavity 7. FIGS. 10 (b) and (d) show a cross sectional views along section A-A of FIG. 10 (a) and section B-B of FIG. 10 (c), revealing internal components of the vehicle 1. With reference to FIG. 10 (b), the second displacement plate 34b is shown extending from the upper part 4u of the vehicle body/framework 4, including the master wheel 30, and to the lower edge of the vehicle 1, including the slave wheels 31,31a,31b (FIG. 11).

Figure 15:
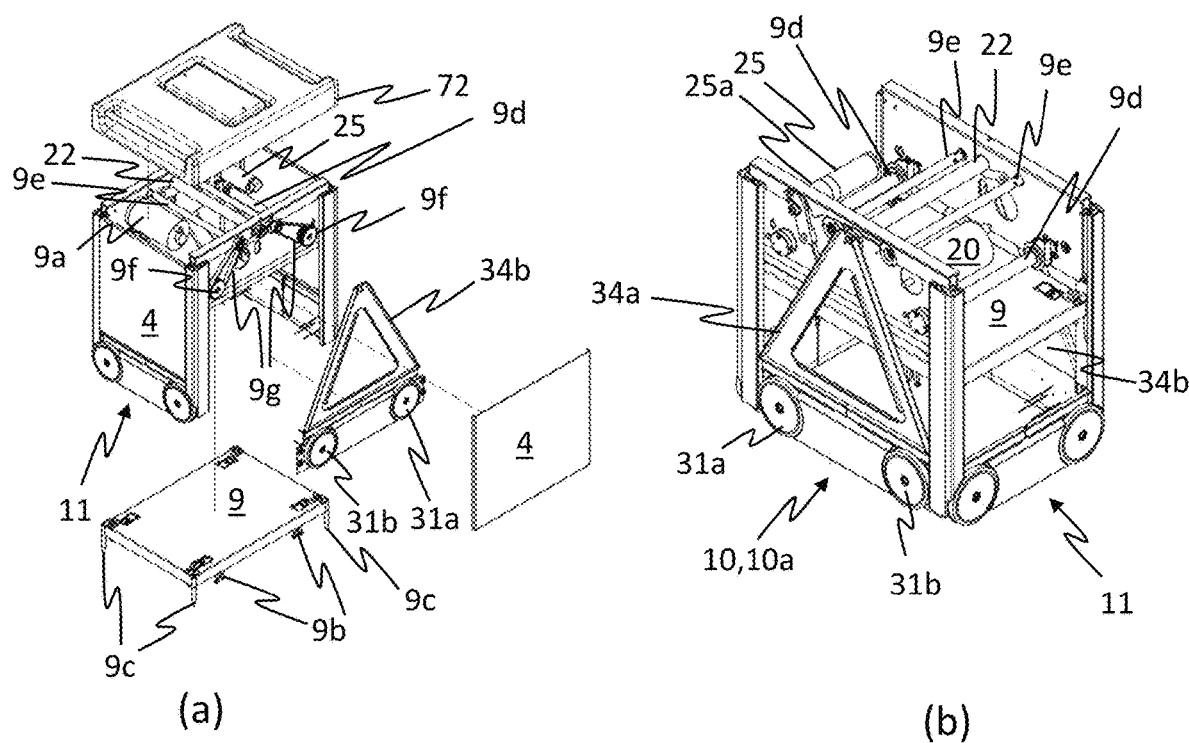
FIGS. 15 (a) and (b) are perspective views of the remotely operated vehicle according to FIGS. 13 and 14 showing the vehicle in an exploded and non-exploded view drawing, respectively, FIGS. 16 (a)-(e) show drawings of a remotely operated vehicle according to FIGS. 13-15 arranged on top of a storage system, where FIGS. 16 (a) and (b) are side views seen along the y direction and the x direction, respectively, FIG. 16 (c) is a top view showing the vehicle positioned directly above a storage column and FIGS. 16 (d) and (e) show in further details a double rail configuration.

The vehicle lifting device 9 includes the vehicle lifting device motor 9a, the lifting grips 9b situated below the lifting device plate for grabbing the underlying bin 2, the guiding pins 9c for adjusting the lifting device 9 in correct lateral position during pick-up of the bin 2, a plurality of first lifting device bars 9d (FIG. 15 (b)) establishing a suspended connection from the upper part 4u of the framework 4 to the lateral extending plate of the lifting device 9, one or more second lifting device bars 9e (FIG. 15 (b)) in rotational connection with both the vehicle lifting device motor, a lifting device sheave 9f (FIG. 15 (a)) attached to one or both ends of each first lifting device bars 9d and a lifting device belt 9g (FIG. 15 (b)) enabling rotational connection between the first and second lifting device bars 9d,9e.

FIG. 10 (b) further shows the drive shafts 35,36 drivingly connected to the driving motor 20 (for rotation of one or both of the master wheel 30 in the X direction) and driving motor 21 (for rotation of one or both of the master wheel 30 in the Y direction). As mentioned previously, the rotation of the master wheels 30 causes a corresponding rotation of the corresponding slave wheels 10,31,11. The lever arm 23 is shown in the lowered position, i.e. where the first set of vehicle rolling means 10 is contacting the underlying rails 13. FIG. 10 (d) shows the lateral positions of the driving motors 20,21, the displacement motor 25 with rotor 25a rotating the lever arm 23 around its fulcrum 26 and the vehicle lifting device motor 9a providing necessary power for lifting/lowering of the vehicle device 9.

The exploded and non-exploded drawings shown in FIGS. 11 (a) and 11 (b), respectively, show, in addition to the components disclosed in FIG. 10, the position of the master wheels 30, the slave wheels 31 and the enclosing belt 32, both in the X direction and the Y direction.

Figure 12:
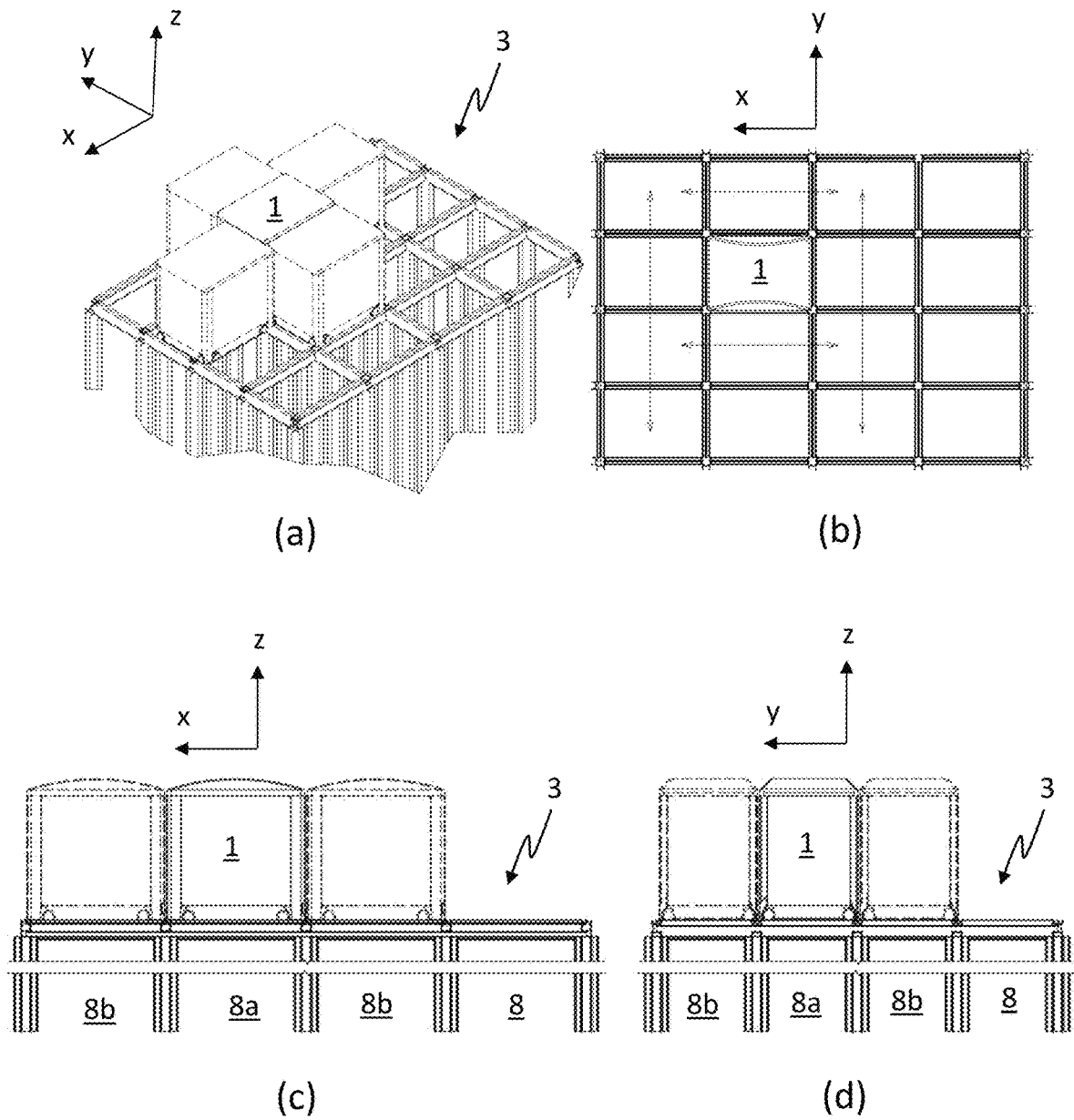
FIGS. 12 (a)-(d) are views of a remotely operated vehicle according to FIGS. 5-11 arranged on top of a storage system, where FIGS. 12 (a) and (b) is a perspective view and a top view, respectively, showing the vehicle in five adjacent positions above a storage columns and FIGS. 12 (c) and (d) are corresponding side views of FIGS. 12 (a) and (b)

The inventive remotely operated vehicle 1 is in FIG. 12 (a)-(d) shown arranged on double track rails 13 constituting part of vehicle support 14 mentioned above. In FIGS. 12 (a), (c) and (d) the vehicle 1 is shown positioned directly above five different columns 8a,8b. Vehicles 1 illustrated with stippled lines indicate possible vehicle positions above columns 8b adjacent to the initial column 8a As is clearly seen in FIG. 12 the lateral cross sectional area of the inventive vehicle 1 occupies exactly the lateral cross sectional area of one underlying column 8,8a,8b, i.e. within the mid part of the double track rails 13 both in X and Y direction. The lateral cross sectional area of the vehicle 1 may of course be smaller or larger than the lateral cross sectional area of the column 8. However, vehicles 1 with a cross sectional area covering a single cell in the storage system 3, combined with use of double track rails 13,13a-d (see FIG. 16 (d)), has the advantageous that is allows vehicles 1 to pass/cross at all four lateral sides while at the same time maintaining a high degree of stability.

Figure 13:
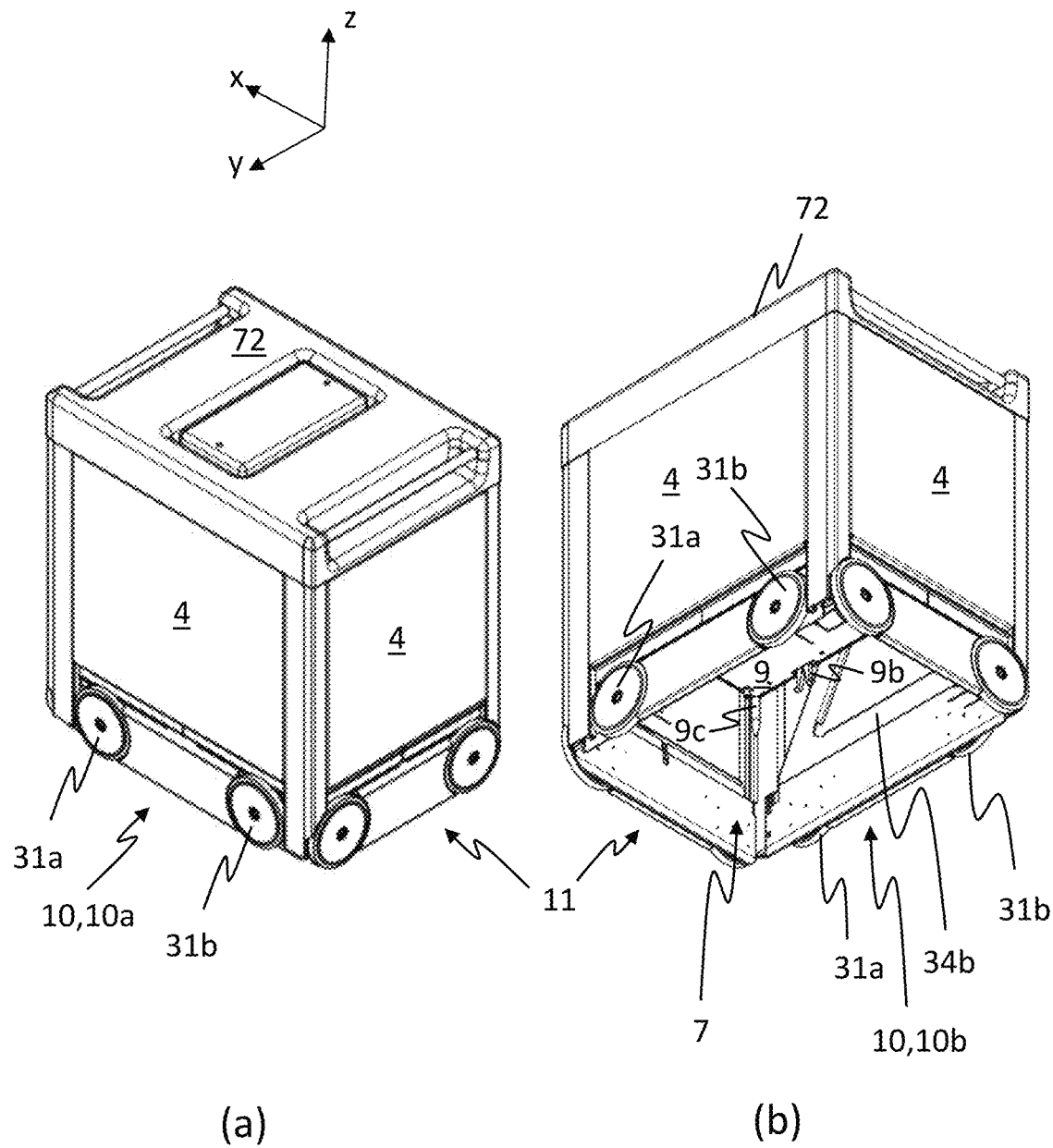
FIGS. 13 (a) and (b) are perspective views in two different angles of a remotely operated vehicle according to a third embodiment of the invention.

A third embodiment according to the invention is shown in FIGS. 13-16, where FIGS. 13 (a) and (b) show the inventive vehicle 1 comprising a top cover 72 (non-removable or removable), a vehicle body/framework 4 covering all sides in the X,Y directions, a first set of vehicle rolling means 10,10a,31a,31b and a second set of vehicle rolling means 11. FIG. 13 (b) also shows part of the cavity 7 and part of the lifting device 9 with its lifting grips 9b and guiding pins 9c.

Figure 14:
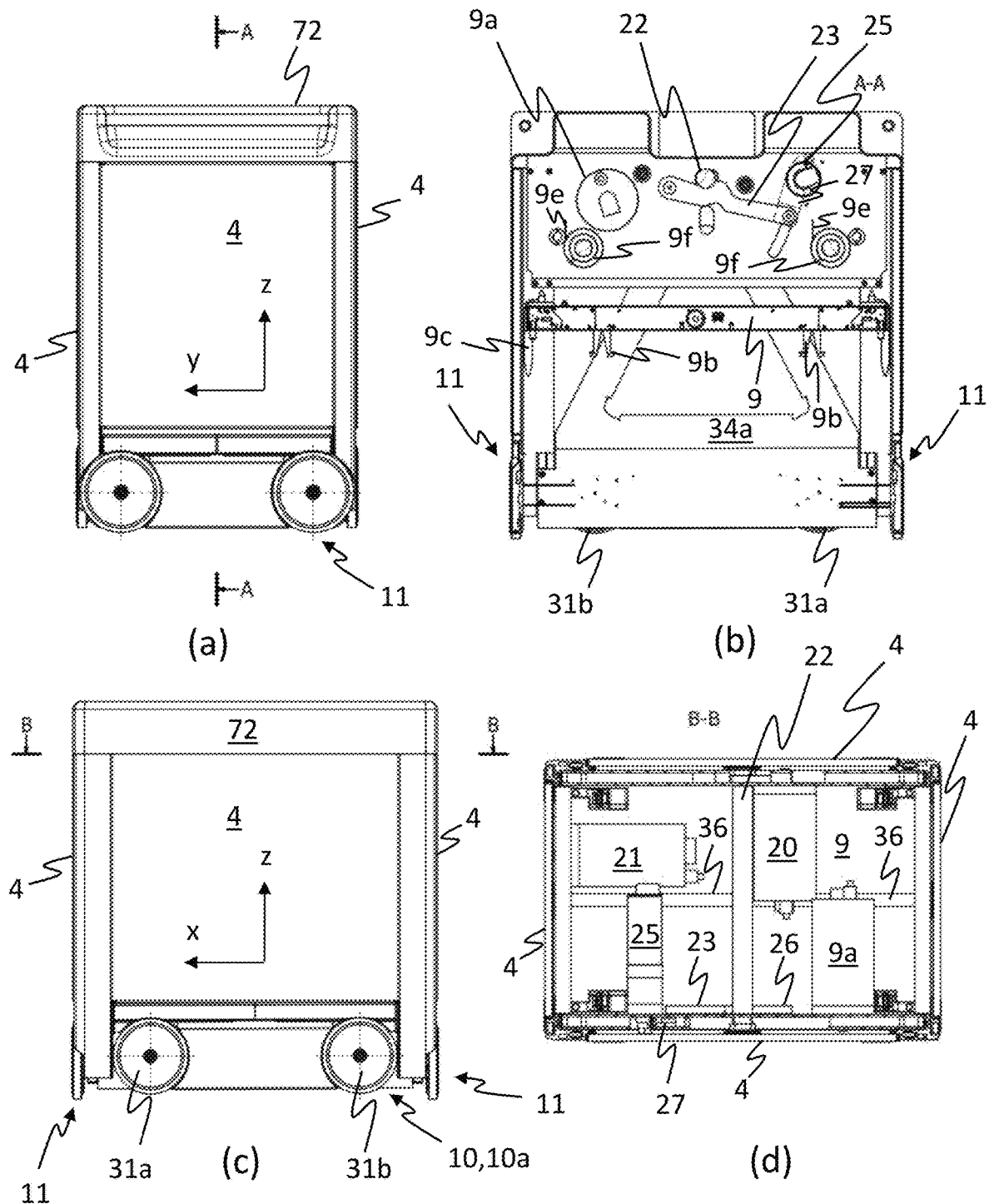
FIGS. 14 (a) to (d) are side views of the remotely operated vehicle according to FIG. 13, where FIG. 14 (a) shows the vehicle seen along x direction with casing, FIG. 14 (b) shows a cross section of the vehicle along the section A-A of FIG. 14 (a), FIG. 14 (c) shows a side view of the vehicle seen along the y direction and FIG. 14 (d) shows a cross section of the vehicle along the section B-B of FIG. 14 (c)

FIGS. 14 (a) and (c) show side views observed along x direction and y direction, respectively, of the third embodiment vehicle shown in FIG. 13. Cross sectional views along section A-A of FIG. 14 (a) and section B-B of FIG. 14 (c) are shown in FIGS. 14 (b) and (d), respectively, revealing internal components of the vehicle 1. As for the second embodiment shown in FIG. 10 (b) the second displacement plate 34b extends from the upper part 4u of the vehicle body 4 to the lower edge of the vehicle 1, including the slave wheels 31,31a,31b (FIG. 15). In addition to the lifting device 9 with its vehicle lifting device motor 9a, lifting grips 9b and guiding pins 9c, FIG. 14 (b) also shows lifting device sheaves 9f and lifting device belt 9g used to lift and lower the lifting device 9. As for the second embodiment and best seen in the exploded and non-exploded drawing in FIGS. 15 (a) and (b), respectively, a plurality of first lifting device bars 9d are connected to each of the lifting device sheaves 9f, and these bars 9d are connecting the two lateral sides of vehicles 1 upper part 4u along the y direction. Further, as seen in FIG. 15 (a) the lifting device belts 9g connect the sheaves 9b and bars 9d to one or more second lifting device bars 9e, which again is in rotary connection with the vehicle lifting device motor 9a. Hence, rotation of the second lifting device bars 9e causes a rotation of the first lifting device bars 9d and sheaves 9f via the lifting device belts 9g, resulting in the desired lifting/lowering of the lifting device 9,9b,9c. The belts connecting the first lifting device bars 9d with the lowered/lifted part are not shown.

The first set of wheels 10 which is configured to be lowered/lifted to/from the rails 13 in order to change direction is mounted together on a common frame. In FIGS. 15 (a) and (b) this frame corresponds to the first and second displacement plates 34a,34b. Both in the second and third embodiments this common frame is rigidly fixed to the displaceable bar 22, thereby enabling vertical displacement by the pivoting the lever arm 23 as described earlier. The common frame may advantageously comprise guiding means/wheels situated at its lower edge in order to facilitate the vertical displacements. However, in contrast to the second embodiment the third embodiment does not necessitate the use of any master wheel 30 to exert rotational force on the first and/or second set of wheels 10,11. The driving means 10,11 may obtain their driving force in lateral (X,Y) direction by the utilization of one or more motors integrated within the driving means, for example by installing rotor magnets within each wheels 10,11, or by installing separate belts/chains extending from driving motors situated in the upper part 4u of the framework 4 to the driving means 10,11, or a combination thereof.

Figure 16:
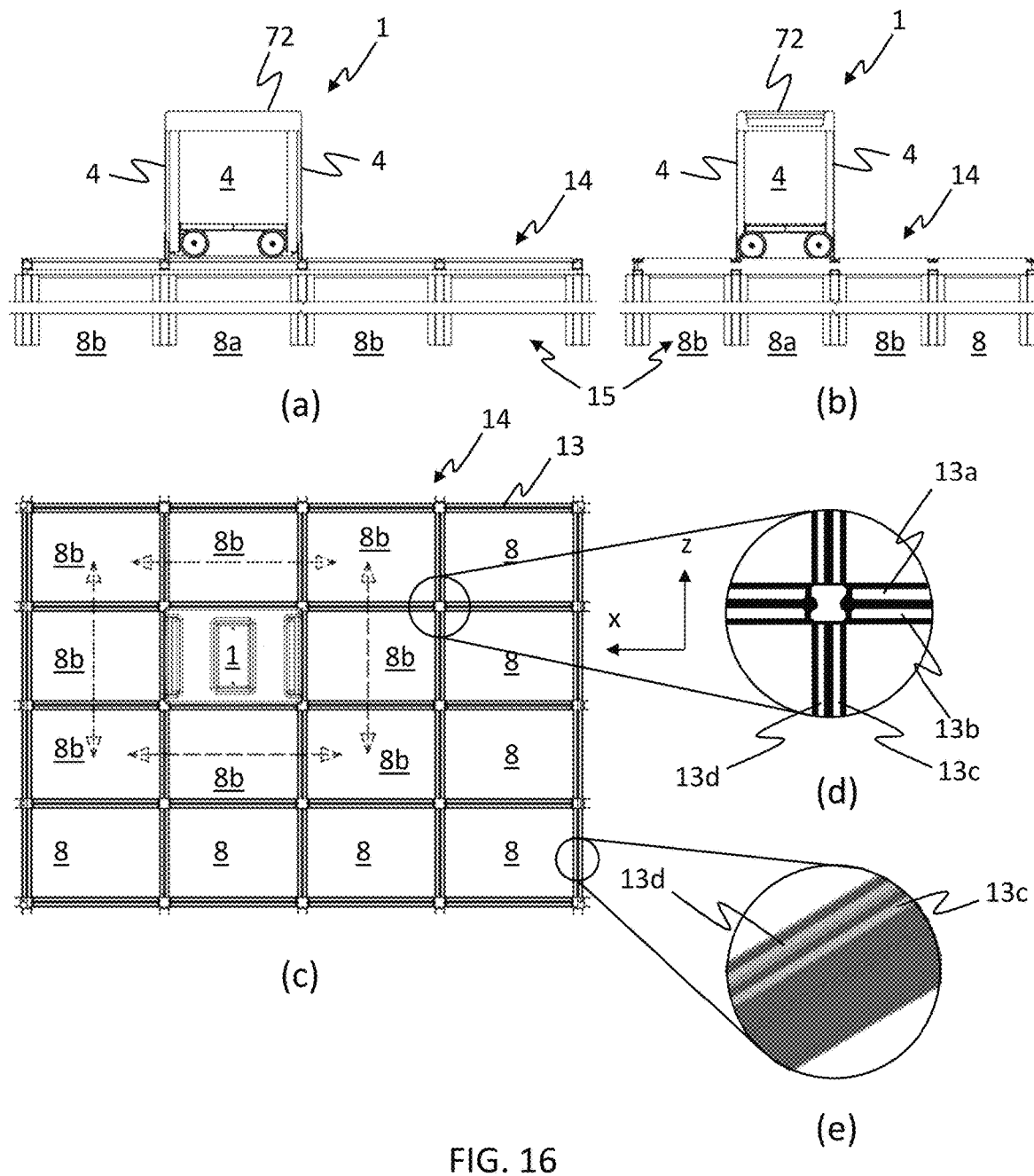

The vehicle 1 in accordance with the third embodiment is in FIG. 16 (a)-(e) shown arranged on double track rails 13 constituting at least part of the vehicle support 14. In FIGS. 16 (a), (b) and (c) the vehicle 1 is shown positioned directly above a central column 8a As is in the second embodiment the lateral cross sectional area of the vehicle 1 occupies exactly, or almost exactly, the lateral cross sectional area of the underlying column 8,8a,8b. The lateral cross sectional area may of course be smaller or larger than the lateral cross sectional area of the column 8. However, vehicles 1 with a cross sectional area covering a single cell in the storage system, combined with use of double track rails 16 (c)-(e), has the advantage of allowing vehicles 1 to pass/cross at all four lateral sides while maintaining optimized stability. FIGS. 16 (d) and (e) show in further details the double track rails 13, where FIG. 16 (d) shows a top view of a cross-over of such double track rails 13 comprising a first and second X-rail 13a,13b directed along the X direction and a third and fourth Y-rail directed along the Y direction, while FIG. 16 (e) shows a perspective side view of part of the double track rail 13 directed along the Y direction.

Figure 17:
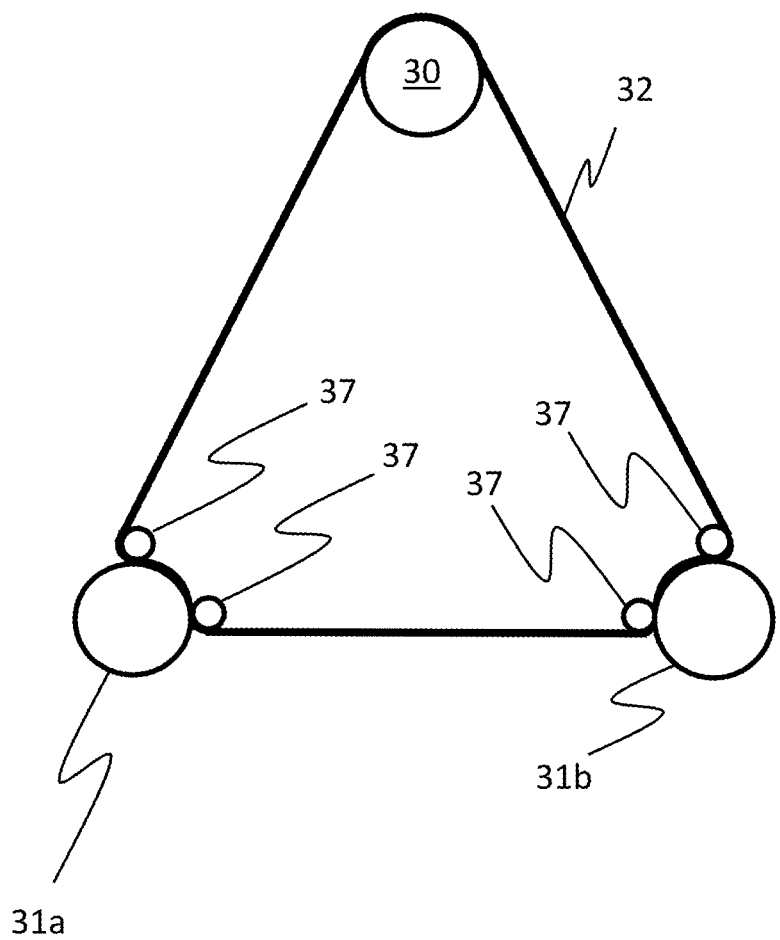
FIG. 17 shows a principal sketch of the wheel configuration at one side walls of the remotely operated vehicle according any one of the embodiments.
Figure 1:
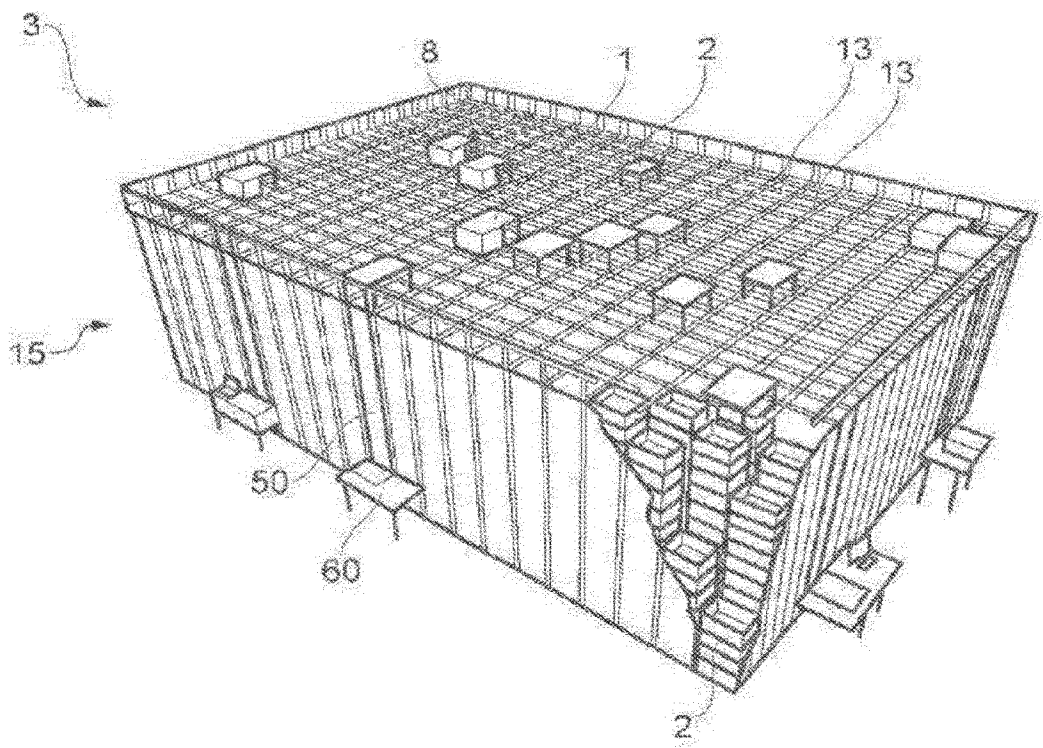
Figure 2:
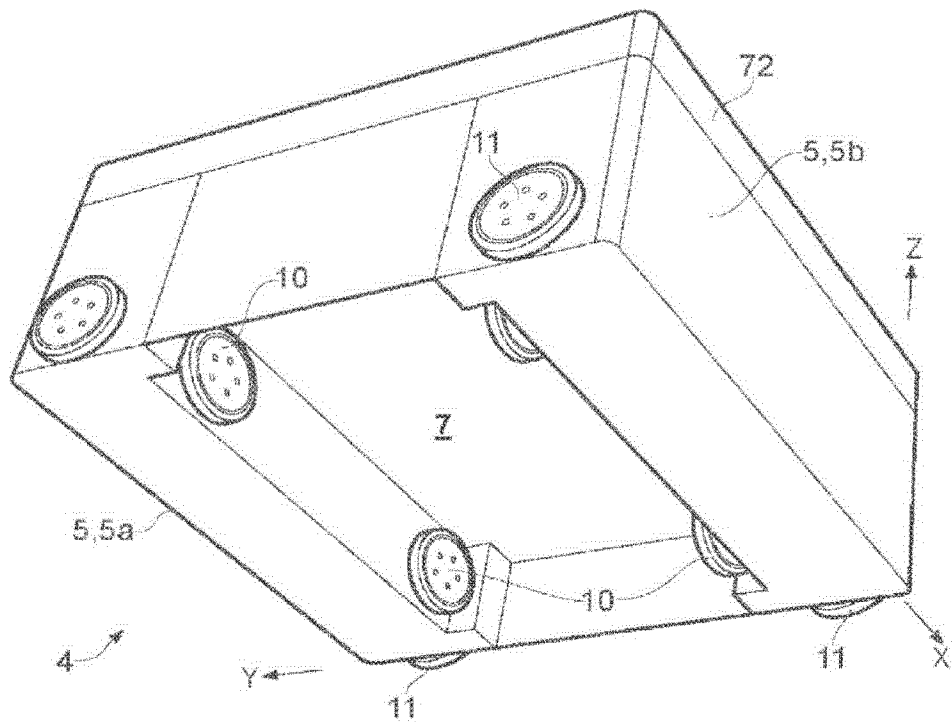
Figure 3:
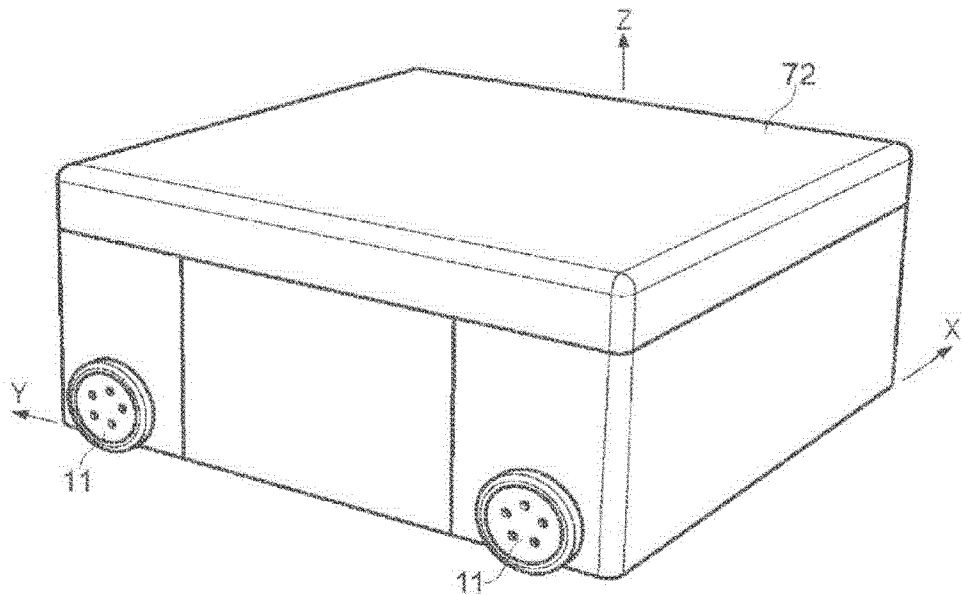

In FIGS. 5-12 the belt 32 interconnecting the master wheel 30 and the slave wheels 31 is shown to completely enclose all wheels 30,31. This configuration is easy to implement and cost effective. However, since the belt 32 is situated between the rotation point of the slave wheels 31a,31b and the underlying storage system 3 the downward directed force may be weakened by dynamic forces, for example during acceleration/deceleration of the vehicle 1. In order to at least mitigate this potential weakening, an alternative driving means configuration is proposed where one or more smaller auxiliary wheels 37, for example two auxiliary wheels, are arranged adjacent at least some, preferably all, of the slave wheels 31a,31b, and where the belt 32 is guided between the slave wheel 31a,31b and its auxiliary wheels 37. This alternative configuration, illustrated in FIG. 17, ensures a desired decrease in the risk of a downward acting pressure force weakening during operation, and thus a more predictable contact force between the slave wheels 31a,31b and the underlying storage system 3.

All operations of the vehicle/robot 1 are controlled by wireless communication means and remote control units. This includes control of the vehicle movements, the directional changes of the vehicle 1, the vehicle lifting device 9 and any registration of the vehicle positions.

In the preceding description, various aspects of the assembly according to the invention have been described with reference to the illustrative embodiment. For purposes of explanation, specific numbers, systems and configurations were set forth in order to provide a thorough understanding of the apparatus and its workings. However, this description is not intended to be construed in a limiting sense. Various modifications and variations of the illustrative embodiment, as well as other embodiments of the apparatus, which are apparent to persons skilled in the art to which the disclosed subject matter pertains, are deemed to lie within the scope of the present invention.

LIST OF REFERENCE NUMERALS/LETTERS

1 Remotely operated vehicle assembly/robot
2 Storage bin
3 Storage system
4 Vehicle body/framework
4b Vertical beam
4r Vertical recess
4u Upper half of vehicle body
7 Cavity
8 Storage column
9 Vehicle lifting device
9a Vehicle lifting device motor
9b Lifting grip
9c Guiding pin
9d First lifting device bar
9e Second lifting device bar
9f Lifting device sheave
9g Lifting device belt
10 First set of vehicle rolling means/driving means
10a First part of vehicle rolling means
10b Second part of vehicle rolling means
11 Second set of vehicle rolling means/driving means
13 Supporting rail
13a First X-rail
13b Second X-rail
13c First Y-rail
13d Second Y-rail
14 Vehicle support
15 Bin storing structure/bin storing grid
20 Driving motor for driving vehicle in X direction
21 Driving motor for driving vehicle in Y direction
22 Displaceable bar
23 Lever arm
25 Displacement motor
25a Rotor of displacement motor
26 First rotatable device/rotatable bolt/fulcrum
27 Locking means/locking arm
28 Second rotatable device/lever arm wheel
30 Upper rotating unit/Master wheel
31 Lower rotating unit/Slave wheel
31a Laterally spaced apart wheel/first slave wheel
31b Laterally spaced apart wheel/second slave wheel
32 Cord/rope/belt
33 Slots
34a First displacement plate
34b Second displacement plate
35 Drive shaft, X direction
36 Drive shaft, Y direction
37 Auxiliary wheel
50 Bin lift device
60 Delivery station/port
72 Top cover
$\Delta z$ Displacement length

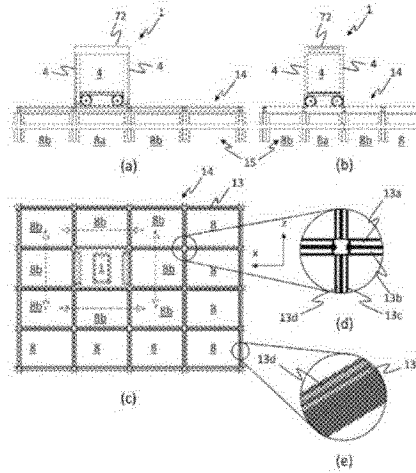

The invention claimed is:

1. A remotely operated vehicle for retrieving and/or replacing items from a storage system comprising a framework structure having a track system at an upper level of the framework structure upon which the vehicle travels, the track system comprising a plurality of tracks arranged in a first direction and a plurality of tracks arranged in a second direction perpendicular to the first direction, whereby intersecting tracks define cells arranged in a grid pattern, through which cells a lifting device of the vehicle may access items stored in the storage system, the vehicle comprising:
a vehicle body or framework displaying a cavity arranged centrally within the vehicle body or framework for receiving and holding an item from the storage system;
the lifting device comprising a gripping member attached to an elongated lowering and raising mechanism arranged for lowering the gripping member through a cell to access a stored item, the gripping member arranged to grip the item and the elongated mechanism being arranged to lift the item into the cavity;
two sets of wheels, a first set of wheels arranged to travel along the tracks in the first direction and a second set of wheels arranged to travel along the tracks in the second direction;
a displacement arrangement comprising a displacement motor,
wherein the displacement motor is configured to provide power or force to vertically displace at least one of the first set of wheels and the second set of wheels between a displaced state and a non-displaced state while the remotely operated vehicle is being operated, wherein the at least one of the first set of wheels and the second set of wheels is displaced away from the tracks in the displaced state, and wherein the at least one of the first set of wheels and the second set of wheels is in contact with the tracks in the non-displaced state, thereby changing the direction of travel of the vehicle; and
at least four vertical beams arranged at corners of the vehicle body or framework for guiding the first set of wheels between the displaced state and the non-displaced state, wherein the at least four vertical beams define the vehicle body or framework with a cuboid shape,
wherein each of the at least four vertical beams features a vertical recess by which the first set of wheels is guided, and
wherein the vehicle body or framework occupies at most a space of a single cell and the tracks defining the cell during a retrieval or replacement operation.

2. The remotely operated vehicle according to claim 1, wherein the cuboid shape is a rectangular cuboid.

3. The remotely operated vehicle according to claim 1, wherein the cavity and cells have lateral areas, and the lateral area, of the cavity matches the lateral area of an underlying cell.

4. The remotely operated vehicle according to claim 1, wherein the at least four vertical beams form parts of the framework of the vehicle.

5. The remotely operated vehicle according to claim 1, wherein at least the first set of wheels or the second set of wheels comprises an upper rotating unit and a lower rotating unit, the upper and lower rotating units being interconnected by a belt.

6. The remotely operated vehicle according to claim 1, wherein a lifting device motor for operating the elongated lowering and raising mechanism is arranged above the cavity.

7. The remotely operated vehicle according to claim 6, wherein at least one rotatable lifting device bar is arranged above the cavity.

8. A storage system for items, comprising:
the remotely operated vehicle according to claim 1, and
a framework structure having a track system at an upper level of the framework structure upon which the vehicle travels, the track system comprising a plurality of tracks arranged in a first direction and a plurality of tracks arranged in a second direction perpendicular to the first direction, whereby intersecting tracks define cells arranged in a grid pattern, through which cells the lifting device of the vehicle may access items stored in the storage system.

9. The storage system according to claim 8, wherein a lateral cross sectional area of the remotely operated vehicle occupies at most a lateral cross sectional area of a single cell and the tracks defining the cell.

10. The remotely operated vehicle according to claim 1, wherein the vertical recess in each vertical beam is arranged in proximity to a corresponding corner of the vehicle body or framework.

* * * * *

UNITED STATES PATENT AND TRADEMARK OFFICE
CERTIFICATE OF CORRECTION

PATENT NO. : 11,772,892 B2
APPLICATION NO. : 17/106209
DATED : October 3, 2023
INVENTOR(S) : Ingvar Hognaland et al.

It is certified that error appears in the above-identified patent and that said Letters Patent is hereby corrected as shown below:

On the Title Page

Replace the title page with the attached title page, showing the corrected number of drawing sheets.

On page 3 Item (56) in the Other Publications section:

The reference listed as "Mage Supporting Art. 123 (1 page)" should read –Image Supporting Art. 123 (1 page).–.

The reference listed as "Mages from D13 (3 pages)" should read –Images from D13 (3 pages).–.

The reference listed as "EPO Notice of Intervention Jan. 1, 2021" should read –EPO Notice of Intervention Jan. 15, 2021.–.

On page 4 Item (56) in the Other Publications section:

The reference listed as "Exhibit 1009 Corrected Norwegian Patent App No. N020140//3" should read –Exhibit 1009 Corrected Norwegian Patent App No. N020140773.–.

In the Drawings

Figure 1:
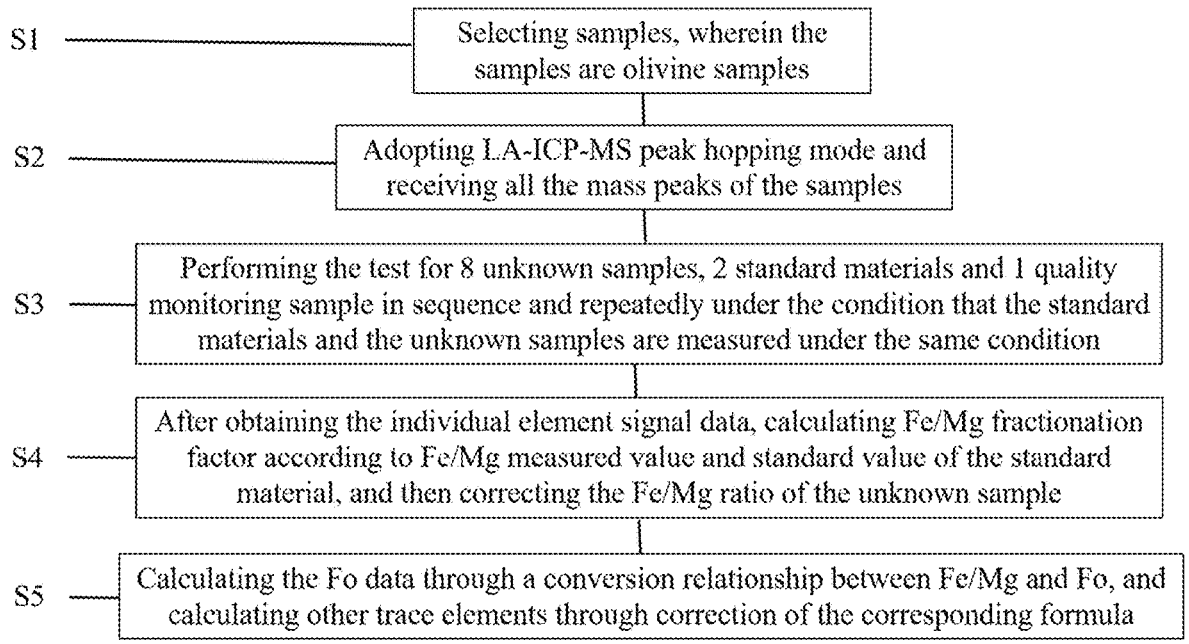
FIG. 1 is a perspective view of a prior art storage system.

Figures 1-3 should appear as shown in the attached sheets.

Signed and Sealed this
Tenth Day of September, 2024

Katherine Kelly Vidal
*Director of the United States Patent and Trademark Office*

(12) United States Patent
Hognaland et al.

(10) Patent No.: US 11,772,892 B2
(45) Date of Patent: Oct. 3, 2023

(54) REMOTELY OPERATED VEHICLE FOR A STORAGE SYSTEM

(71) Applicant: Autostore Technology AS, Nedre Vats (NO)

(72) Inventors: Ingvar Hognaland, Nedre Vats (NO); Ivar Fjeldheim, Haugesund (NO); Trond Austrheim, Etne (NO); Borge Bekken, Haugesund (NO)

(73) Assignee: Autostore Technology AS, Nedre Vats (NO)

( * ) Notice: Subject to any disclaimer, the term of this patent is extended or adjusted under 35 U.S.C. 154(b) by 0 days.

(21) Appl. No.: 17/106,209

(22) Filed: Nov. 30, 2020

(65) Prior Publication Data

US 2021/0078802 A1   Mar. 18, 2021

Related U.S. Application Data

(63) Continuation of application No. 15/978,219, filed on May 14, 2018, now Pat. No. 10,882,694, which is a
(Continued)

(30) Foreign Application Priority Data

Jun. 19, 2014   (NO) .................................. 20140773

(51) Int. Cl.
*B65G 1/04* (2006.01)

(52) U.S. Cl.
CPC ......... *B65G 1/0464* (2013.01); *B65G 1/0478* (2013.01)

(58) Field of Classification Search
CPC ............................ B65G 1/0464; B65G 1/0478
See application file for complete search history.

(56) References Cited

U.S. PATENT DOCUMENTS 3,779,403 A   12/1973 Young
3,800,963 A   4/1974 Holland
(Continued)

FOREIGN PATENT DOCUMENTS

CA   2920669 A1   2/2015
CH   640797 A5   1/1984
(Continued)

OTHER PUBLICATIONS

Office Action in counterpart Japanese Patent Application No. 2020-190730 dated Jul. 9, 2021 (25 pages).
(Continued)

*Primary Examiner* — James Keenan
(74) *Attorney, Agent, or Firm* — Osha Bergman Watanabe & Burton LLP

(57) ABSTRACT

A remotely-operated vehicle assembly for picking up storage bins from a storage system and a method for changing vehicle direction includes a body displaying a cavity, a lifting device connected to the body for lifting the bin into the cavity, a displacement arrangement including a displacement motor which provides power to displace one or both of first and second sets of vehicle wheels between a displaced state where the relevant vehicle wheels are displaced away from the underlying system during use, and a non-displaced state where the relevant vehicle wheels are in contact with the underlying system during use, and driving wheels coupled to the displacement arrangement. The driving wheels further includes first and second sets of vehicle wheels connected to the body allowing movement of the vehicle along first and second directions, respectively, within the system. The first and second directions are perpendicular.

10 Claims, 19 Drawing Sheets